US005416637A

United States Patent [19]

Wakatake

[11] Patent Number: 5,416,637

[45] Date of Patent: May 16, 1995

[54] PSEUDO-LUMINOUS PANEL, SUBSTRATE THEREFOR, AND DISPLAY ELEMENT AND DEVICE USING THE PSEUDO-LUMINOUS PANEL

[75] Inventor: Yoshimasa Wakatake, Tokyo, Japan

[73] Assignee: Masayuki Wakatake, Happy Valley, Hong Kong; a part interest

[21] Appl. No.: 98,154

[22] Filed: Jul. 28, 1993

Related U.S. Application Data

[62] Division of Ser. No. 839,432, Feb. 24, 1992, Pat. No. 5,351,153.

[30] Foreign Application Priority Data

Feb. 24, 1991 [JP] Japan .................................. 3-050636

[51] Int. Cl.$^{6}$ ................................................ G02B 5/02

[52] U.S. Cl. .................................... 359/599; 359/850; 359/546; 40/560

[58] Field of Search ............... 359/850, 546, 547, 599, 359/530, 548; 40/560, 427

[56] References Cited

U.S. PATENT DOCUMENTS

| | | | |
|---|---|---|---|
| 2,043,690 | 12/1931 | Arbuckle et al. | 40/582 |
| 2,154,360 | 5/1936 | Scheel et al. | 40/582 |
| 2,184,721 | 12/1939 | McIlvanie | 40/614 |
| 2,380,447 | 11/1937 | Jungersen | 359/547 |
| 3,353,897 | 11/1965 | Lemelson | 359/621 |
| 3,359,671 | 12/1967 | Nier et al. | 40/615 |
| 5,299,061 | 3/1994 | Wakatake | 359/547 |
| 5,351,153 | 9/1994 | Wakatake | 359/599 |
| 5,363,237 | 11/1994 | Wakatake | 359/546 |

FOREIGN PATENT DOCUMENTS

| | | |
|---|---|---|
| 2057148 | 5/1972 | Germany . |
| 3440468 | 6/1986 | Germany . |
| 153643 | 3/1932 | Switzerland . |
| 315336 | 7/1929 | United Kingdom . |

*Primary Examiner*—Loha Ben
*Assistant Examiner*—M. Sikder
*Attorney, Agent, or Firm*—Sixbey, Friedman, Leedom & Ferguson; Gerald J. Ferguson, Jr.; David S. Safran

[57] ABSTRACT

A pseudo-luminous panel has a substrate and a thin film optical color filter formed all over the main surface of the substrate with or without a reflecting film interposed therebetween. The main surface of the substrate is formed by obliquely downward and upward band-like surfaces alternately arranged side by side in a vertical direction. The downward band-like surfaces of the substrate, or downward band-like surfaces of the reflecting film formed on the downward band-like surfaces of the substrate are each a smooth reflecting surface. The upward band-like surfaces of the substrate, or the upward band-like surfaces of the reflecting film formed on the upward band-like surfaces of the substrate, are each a smooth, irregular or uneven reflecting surface. Obliquely downward band-like surfaces of the color filter are each a smooth surface extending straight in the longitudinal section of the panel, and obliquely upward band-like surfaces of the color filter are each a rough surface. With the pseudo-luminous panel of such a structure, it is possible to prevent that a pattern on the panel is too dazzling in the daytime and too dark at night to recognize in a predetermined hue when the panel is set up outdoors high above the ground.

8 Claims, 28 Drawing Sheets

PSEUDO-LUMINOUS PANEL, SUBSTRATE THEREFOR, AND DISPLAY ELEMENT AND DEVICE USING THE PSEUDO-LUMINOUS PANEL

This is a Divisional application of Ser. No. 07/839,432, filed Feb. 24, 1992, now U.S. Pat. No. 5,351,153.

BACKGROUND OF THE INVENTION

1. Field of the Invention

The present invention relates to a pseudo-luminous panel, a substrate therefor and a display element and a display device employing the pseudo-luminous panel.

2. Description of the Prior Art

FIGS. 47 and 48 show a conventional pseudo-luminous panel Q which has, for example, a square substrate 1 the main surface 2 of which is formed by an irregular or uneven reflection surface DR extending in a vertical plane.

When such a conventional pseudo-luminous panel Q is disposed outdoors, for example, high above the ground G by use of a support H as shown in FIG. 49, the main surface 2 of the substrate 1 is directly irradiated over the entire area thereof by sunlight SL from above diagonally to the front of the substrate 1 in the daytime. In other word, the sunlight SL directly illuminates the main surface 2 of the substrate 1 over the entire area thereof from above diagonally to the front of the substrate 1. The sunlight SL thus falling on the main surface 2 of the substrate 1 enters thereinto. In this instance, since the main surface 2 of the substrate 1 is the irregular or uneven reflection surface DR, the sunlight SL incident on such a main surface 2 irregularly enters therethrough into the substrate 1. The sunlight SL thus having irregularly entered into the substrate 1 is irregularly reflected therein. The irregularly reflected light is emitted forwardly of the pseudo-luminous panel Q through the main surface 2 of the substrate 1. In this case, the irregularly reflected light is irregularly emitted from the panel Q, since the main surface 2 is formed by the irregular or uneven reflection surface DR as mentioned above. Thus, scattered light SL' derived from the sunlight SL is provided in front of the pseudo-luminous panel Q.

The scattered light SL' results from the passage through the portion of the main surface 2 of the substrate 1, and hence has a hue corresponding to the pass band of the main surface portion of the substrate 1 in terms of its band pass characteristic. A portion of the scattered light SL' emitted from the pseudo-luminous panel Q is directed toward the ground G. Hence, in the daytime a person M standing on the ground G diagonally below the pseudo-luminous panel Q can perceive a pattern on the main surface 2 in a color tone corresponding to the pass band of the main surface portion of the substrate 1.

When irradiating the pseudo-luminous panel 1, at night, by artificial light AL of a band convering the pass band of the main surface portion of the substrate 1 from a projector P disposed on the ground G diagonally below to the front of the panel Q, as shown in FIG. 49, the artificial light AL irregularly enters into the main surface portion of the substrate 1 through the main surface 2 and is then irregularly reflected and the irregularly reflected light is emitted as scattered light AL' from the pseudo-luminous panel Q through the main surface 2 of the substrate 1.

As is the case with the scattered light SL', the scattered light AL' also results from the passage through the main surface portion of the substrate 1, and hence has hue corresponding to the pass band of the main surface portion of the substrate 1, and a portion of scattered light AL' is directed to the ground G. Accordingly, the person M on the ground G can perceive a pattern on the main surface 2 of the substrate 1 in a color tone corresponding to the pass band of the main surface portion of the substrate 1.

Thus, in the case where the conventional pseudo-luminous panel Q shown in FIGS. 47 and 48 is disposed outdoors, for example, high above the ground G and is irradiated by the sunlight SL in the daytime and by the artificial light AL from the projector P at night as described above, it is possible to make the person M on the ground G perceive day and night the pattern on the main surface 2 of the substrate 1 in the hue corresponding to the pass band of the main surface portion of the substrate 1.

Incidentally, the energy of the artificial light AL from the projector P is far lower than the energy of the sunlight SL owing to a limitation on the manufacture of the projector P and for some other reason. Hence there is a markely large difference between the energy of the sunlight SL received by the pseudo-luminous panel Q in the daytime and the energy of the artificial light AL illuminating the panel Q at night. In the daytime the viewer M perceives a pattern on the main surface 2 of the substrate 1 by a portion of the scattered light SL' caused by irregular reflection of the sunlight SL and at night he perceives the pattern on the main surface 2 by a portion of the scattered light AL' similarly caused by irregular reflection of the artificial light AL.

On this account, the conventional pseudo-luminous panel Q depicted in FIGS. 47 and 48 is defective in that when the substrate 1 is made relatively highly reflective by a suitable selection of its material so as to permit the viewer M to distinctly recognize the pattern on the main surface 2 of the substrate 1 at night, the pattern is so dazzling in the daytime that the viewer M may sometime be unable to perceive the pattern itself.

Moreover, when the reflectivity of the substrate 1 is made low by a suitable selection of its material so that the pattern on the main surface 2 can clearly be recognized by the viewer M in the daytime, the pattern is very dark at night and in some cases it cannot be perceived in the color tone corresponding to the pass band of the main surface portion of the substrate 1.

SUMMARY OF THE INVENTION

It is therefore an object of the present invention to provide a novel pseudo-luminous panel which is free from the above-mentioned defects of the prior art, and a substrate for such a panel and a display element and a display device utilizing such a pseudo-luminous panel.

According to a first aspect of the present invention, the pseudo-luminous panel has a substrate and a thin film optical color filter coated all over the main surface of the substrate. The main surface of the substrate is a surface in which obliquely downward and upward band-like portions are alternately arranged side by side in the vertical direction. The obliquely downward band-like portions each form a smooth reflecting surface, and the obliquely upward band-like portions each form an irregular or uneven reflecting surface.

Obliquely downward band-like portions of the thin film optical color filter, formed on the obliquely downward band-like portions of the substrate on the opposite-side therefrom, are smooth.

According to a second aspect of the present invention, the pseudo-luminous panel has a substrate and a thin film optical color filter coated all over the main surface of the substrate. The main surface of the substrate is a surface in which obliquely downward and upward band-like portions are alternately arranged side by side in the vertical direction. The obliquely downward and upward band-like portions forming the main surface of substrate are each a smooth reflecting surface, obliquely downward band-like portions of the thin film optical color filter, formed on the obliquely downward band-like portions of the substrate on the opposite side therefrom, are smooth surfaces. Obliquely upward band-like portions of the thin film optical color filter, formed on the obliquely upward band-like portions of the substrate on the opposite side therefrom, are uneven.

According to a third aspect of the present invention, the pseudo-luminous panel has a substrate, a reflecting film coated all over the main surface of the substrate and a thin film optical color filter coated all over the surface of the reflecting film on the opposite side from the substrate. The main surface of the substrate is a surface in which obliquely downward and upward band-like portions are alternately arranged side by side in the vertical direction. Obliquely downward band-like portions of the reflecting film, formed on the obliquely downward band-like portions of the substrate on the opposite side therefrom, are smooth reflecting surfaces. Obliquely upward band-like portions of the reflecting film, formed on the obliquely upward band-like portions of the substrate on the opposite side therefrom, are irregular or uneven reflecting surface. Obliquely downward band-like portions of the thin film optical color filter, formed on the obliquely downward band-like portions of the reflecting film on the opposite side therefrom, are smooth surfaces.

According to a fourth aspect of the present invention, the pseudo-luminous panel has a substrate, a reflecting film coated all over the main surface of the substrate and a thin film optical color filter coated all over the surface of the reflecting film on the opposite side from the substrate. The main surface of the substrate is a surface in which obliquely downward and upward band-like portions are alternately arranged side by side in the vertical direction. Obliquely downward and upward band-like portions of the reflecting film, formed on the obliquely downward and upward band-like portions of the substrate on the opposite side therefrom, form smooth reflecting surfaces. Obliquely downward band-like portions of the thin film optical color filter, formed on the obliquely downward band-like portions of the reflecting film on the opposite side therefrom, have smooth surface. Obliquely upward band-like portions of the thin film optical color filter, formed on the obliquely upward band-like portions of the reflecting film on the opposite side therefrom, have uneven surfaces.

According to a fifth aspect of the present invention, in the pseudo-luminous panel according to the first, second, third or fourth aspect of the invention, the obliquely downward band-like portions forming the main surface of the substrate each protrude obliquely downward in its longitudinal section and linearly extend in its cross-section.

According to a sixth aspect of the present invention, in the pseudo-luminous panel according to the first, second, third or fourth aspect of the invention, the obliquely downward band-like portions forming the main surface of the substrate each protrude obliquely downward in its longitudinal section and repeatedly protrude forward in its cross-section.

According to a seventh aspect of the present invention, the substrate is flexible in the pseudo-luminous panel according to the first, second, third or fourth aspect of the invention.

According to an eighth aspect of the present invention, the substrate for the pseudo-luminous panel has its main surface formed by a surface in which obliquely downward and upward band-like portions are alternately arranged side by side in the vertical direction. The obliquely downward band-like portions form smooth reflecting surfaces, and the obliquely upward band-like portions form irregular or uneven reflecting surfaces.

According to a ninth aspect of the present invention, the substrate for the pseudo-luminous panel has its main surface formed by a surface in which obliquely downward and upward band-like portions are alternately arranged side by side in the vertical direction. The obliquely downward and upward band-like portions form smooth reflecting surfaces.

According to a tenth aspect of the present invention, in the substrate according to the ninth aspect of the invention the obliquely downward band-like portions each protrude obliquely downward in its longitudinal section and linearly extend in its cross-section.

According to eleventh aspect of the present invention, in the substrate according to the eighth or ninth aspect of the invention the obliquely downward band-like portions each protrude obliquely downward in its longitudinal section and repeatedly protrude forward in its cross-section.

According to a twelfth aspect of the present invention, the substrate according to the eighth or ninth aspect of the invention is flexible.

According to a thirteenth aspect of the present invention, the substrate for the pseudo-luminous panel has a substrate and a reflecting film coated all over the main surface of the substrate. The main surface of the substrate is a surface in which obliquely downward and upward band-like portions are alternately arranged side by side in the vertical direction. Obliquely downward band-like portions of the reflecting film, formed on the obliquely downward band-like portions of the substrate on the opposite side therefrom, form smooth reflecting surfaces. Obliquely upward band-like portions of the reflecting film, formed on the obliquely upward band-like portions of the substrate on the opposite side therefrom, form irregular or uneven reflecting surfaces.

According to a fourteenth aspect of the present invention, the substrate for the pseudo-luminous panel has a substrate and a reflecting film coated all over the main surface of the substrate. The main surface of the substrate is a surface in which obliquely downward and upward band-like portions are alternately arranged side by side in the vertical direction. Obliquely downward and upward band-like portions of the reflecting film, formed on the obliquely downward and upward band-like portions of the substrate on the opposite side therefrom, form smooth reflecting surfaces.

According to a fifteenth aspect of the present invention, in the substrate according to the thirteenth or fourteenth aspect of the invention the obliquely downward band-like portions forming the main surface of the substrate each protrude obliquely downward in its longitudinal section and linearly extend in its cross-section.

According to a sixteenth aspect of the present invention, in the substrate according to the thirteenth or fourteenth aspect of the invention the obliquely downward band-like portions of the main surface of the substrate protrude obliquely downward in its longitudinal section and repeatedly protrude forward in its cross-section.

According to a seventeenth aspect of the present invention, the substrate according to the thirteenth or fourteenth aspect of the invention is flexible.

According to an eighteenth aspect of the present invention, the display element employs a plurality of pseudo-luminous panels according to the first, second, third or fourth aspect of the invention. The plurality of pseudo-luminous panels are arranged on a support frame so that they are selectively activated. The thin film optical color filters of the pseudo-luminous panels have different pass bands in terms of their band-pass characteristics.

According to a nineteenth aspect of the present invention, the fixed matrix display employs a plurality of pseudo-luminous panels according to the first, second, third or fourth aspect of the invention, and they are arranged in a matrix form on a support frame.

According to twentieth aspect of the present invention, the matrix display employs a plurality of display elements, which are arranged in a matrix form on a support frame. In this instance, the display elements each have a plurality of pseudo-luminous panels according to the first, second, third or fourth aspect of the invention. The pseudo-luminous panels are arranged on a support frame so that they are selectively activated. The thin film optical color filters of the pseudo-luminous panels have different pass bands in terms of their band-pass characteristics.

When the pseudo-luminous panel according to the first aspect of the present invention is disposed outdoors, for instance, high above the ground as described previously in respect of FIG. 49, sunlight directly strikes the obliquely upward band-like surface portions of the thin film optical color filter on the substrate at an angle from above but hardly strike the obliquely downward band-like surface portions of the color filter. The sunlight directly striking the obliquely upward band-like surface portions of the color filter enter thereinto and then the obliquely upward band-like portions forming the main surface of the substrate. Since the obliquely upward band-like portions of the main surface of the substrate are irregular reflecting surfaces or uneven surfaces, the sunlight is irregularly reflected on and in the obliquely upward band-like portions of the substrate surface. The irregular reflected light passes again through the thin film optical color filter and then its obliquely upward band-like surface portions, thereafter being emitted as scattered light from the pseudo-luminous panel.

Since the scattered light has passed through the thin film optical color filter, it has a hue corresponding to the pass band of the color filter in terms of its band-pass characteristic. A portion of the scattered light naturally falls on the ground, and consequently, the viewer on the ground can perceive a pattern on the main surface of the substrate in the hue corresponding to the pass band of the optical color filter.

By suitably selecting the position of the projector relative to the pseudo-luminous panel set up above the ground as shown in FIG. 49, the artificial light can be projected from the projector, at night, mostly onto the obliquely downward band-like surface portions of the thin film optical color filter.

The artificial light directly striking the obliquely downward band-like surface portions of the color filter enters thereinto and then the underlying surface portions of the substrate. Since the obliquely downward band-like surface portions of the substrate are smooth reflecting surfaces, the incident light is hardly irregularly reflected but is reflected obliquely downward by the substrate. The reflected light passes through the color filter again and its obliquely downward surface portions and is emitted diagonally downward from the pseudo-luminous panel.

The reflected light thus emitted from the panel has passed through the thin film optical color filter, and hence has a hue corresponding to the pass band of the color filter in terms of its band-pass characteristic. Thus the viewer on the ground can perceive a pattern on the main surface of the substrate in the hue corresponding to the pass band of the color filter.

With such a pseudo-luminous panel according to the first aspect of the present invention, the pattern on the main surface of the substrate can be seen from the ground equally in the daytime and at night in the hue corresponding to the pass band of the color filter.

Also in this instance, the energy of the artificial light is far lower than the energy of sunlight for the same reasons given previously with respect to the conventional pseudo-luminous panel depicted in FIGS. 47 and 48, and there is a substantial difference between the energy of sunlight striking the panel in the day time and the energy of the artificial light projected onto the panel at night. However, in the daytime the viewer on the ground perceives the pattern on the main surface of the substrate by a portion of the scattered light resulting from the irregular reflection of sunlight, whereas at night the perceives the pattern mainly by the directly reflected light of the artificial light, not portion of such scattered light.

Hence, even if the reflectivity of the substrate is made relatively high by a suitable selection of its material so that the pattern on its main surface can be clearly recognized at night, the pattern is not dazzling in the daytime and can be seen in the hue based on the pass band of the color filter. Further, even if the reflectivity of the substrate is made relatively low by a suitable selection of its material so that the dazzling of the pattern is reduced in the daytime, the pattern is not dark and can be seen at night as well in the hue based on the pass band of the color filter.

The pseudo-luminous panel according to the second aspect of the present invention is identical in construction with the panel according to the first aspect of the invention, except that the obliquely upward band-like surface portions of the substrate form smooth surfaces, not irregular or uneven reflecting surfaces. Although the obliquely upward band-like surface portions of the substrate are smooth reflecting surfaces as mentioned above, the same results as are obtainable with the pseudo-luminous panel according to the first aspect of the invention can be obtained, though not described in detail, since the obliquely upward band-like surface portions of the thin film optical color filter are uneven surfaces.

With the pseudo-luminous panel according to the third aspect of the invention wherein the surface of the reflecting film corresponds to the main surface of the substrate in the pseudo-luminous panel according to the first aspect of the invention, it is possible to obtain the same results as are obtainable with the panel according to the first aspect of the invention.

The pseudo-luminous panel according to the fourth aspect of the present invention is identical in construction with the panel according to the third aspect of the invention except that the obliquely upward band-like surface portions of the reflecting film form smooth reflecting surfaces, not irregular or uneven reflecting surfaces. Hence, it is possible to obtain the same results as are obtainable with the structures according to the third and second aspects of the invention.

With the pseudo-luminous panel according to the fifth aspect of the present invention, reflected artificial light emitted diagonally downward from the pseudo-luminous panel spreads in the vertical direction but does not scatter in the lateral direction. This structure allows the pattern on the main surface of the substrate to be distinctly seen at night from positions almost everywhere in front of the panel and from positions within a certain area limited in the lateral direction relative to the panel.

With the pseudo-luminous panel according to the sixth aspect of the present invention, reflected artificial light emitted diagonally downward from the pseudo-luminous panel spread both in the vertical direction and in the lateral direction. This structure allows the pattern on the main surface of the substrate to be distinctly seen at night from positions almost everywhere both in front of the panel and in the lateral direction relative thereto.

The pseudo-luminous panel according to the seventh aspect of the present invention can be rolled up just like a sheet, and hence is easy to handle.

With the substrate according to the eighth aspect of the present invention, the pseudo-luminous panel according to the first aspect of the invention which produces the afore-mentioned excellent effects can easily be obtained simply by coating its thin film optical color filter over the main surface of the substrate.

With the substrate according to the ninth aspect of the present invention, the pseudo-luminous panel according to the second aspect of the invention which produces the afore-mentioned excellent effects can easily be obtained simply by coating its thin film optical color filter over the main surface of the substrate.

With the substrate according to the tenth aspect of the present invention, the pseudo-luminous panel according to the fifth aspect of the invention which produces the afore-mentioned excellent effects can easily be obtained simply by coating over the main surface of the substrate the thin film optical color filter in the pseudo-luminous panel according to the first or second aspect of the invention.

With the substrate according to the eleventh aspect of the present invention, the pseudo-luminous panel according to the sixth aspect of the invention which produces the afore-mentioned excellent effects simply by coating over the main surface of the substrate the thin film optical color filter in the pseudo-luminous panel according to the first or second aspect of the invention.

With the substrate according to the twelfth aspect of the present invention, the pseudo-luminous panel according to the seventh aspect of the invention which produces the afore-mentioned excellent effects can easily be obtained simply by coating over the main surface of the substrate the thin film optical color filter in the pseudo-luminous panel according to the first or second aspect of the invention.

With the substrate according to the thirteenth aspect of the present invention, the pseudo-luminous panel according to the third aspect of the invention which produces the afore-mentioned excellent effects can easily be obtained simply by coating the reflecting film over its main surface with the thin film optical color filter in the pseudo-luminous panel according to the third aspect of the invention.

With the substrate according to the fourteenth aspect of the present invention, the pseudo-luminous panel according to the fourth aspect of the invention which produces the afore-mentioned excellent effects can easily be obtained by coating its thin film optical color filter over the main surface of the reflecting film of the substrate.

With the substrate according to the fifteenth aspect of the present invention, the pseudo-luminous panel according to the tenth aspect of the invention can easily be obtained simply by coating over the main surface of the reflecting film of the substrate the thin film optical color filter in the pseudo-luminous panel according to the third or fourth aspect of the invention.

With the substrate according to the sixteenth aspect of the present invention, the pseudo-luminous panel according to the eleventh aspect of the invention can easily be obtained simply by coating over the main surface of the reflecting film of the substrate the thin film optical color filter in the pseudo-luminous panel according to the third or fourth aspect of the invention.

With the substrate according to the seventeenth aspect of the present invention, the pseudo-luminous panel according to the twelfth aspect of the invention which produces the aforementioned excellent effects can easily be obtained simply by coating over the main surface of the substrate the thin film optical color filter in the pseudo-luminous panel according to the third or fourth aspect of the invention.

With the display element according to the eighteenth aspect of the present invention, different hues based on different pass bands of the respective thin film optical color filters can be obtained, together with the afore-mentioned excellent effects.

With the fixed matrix display device according to the nineteenth aspect of the present invention, characters, figures and other patterns can be displayed in a desired hue together with the afore-mentioned excellent effects.

With the matrix display device according to the twentieth aspect of the present invention, characters, figures and other patterns selected as desired can be displayed in a desired hue together with the aforementioned excellent effects.

DESCRIPTION OF THE PREFERRED EMBODIMENTS

Embodiment 1

Figure 2:
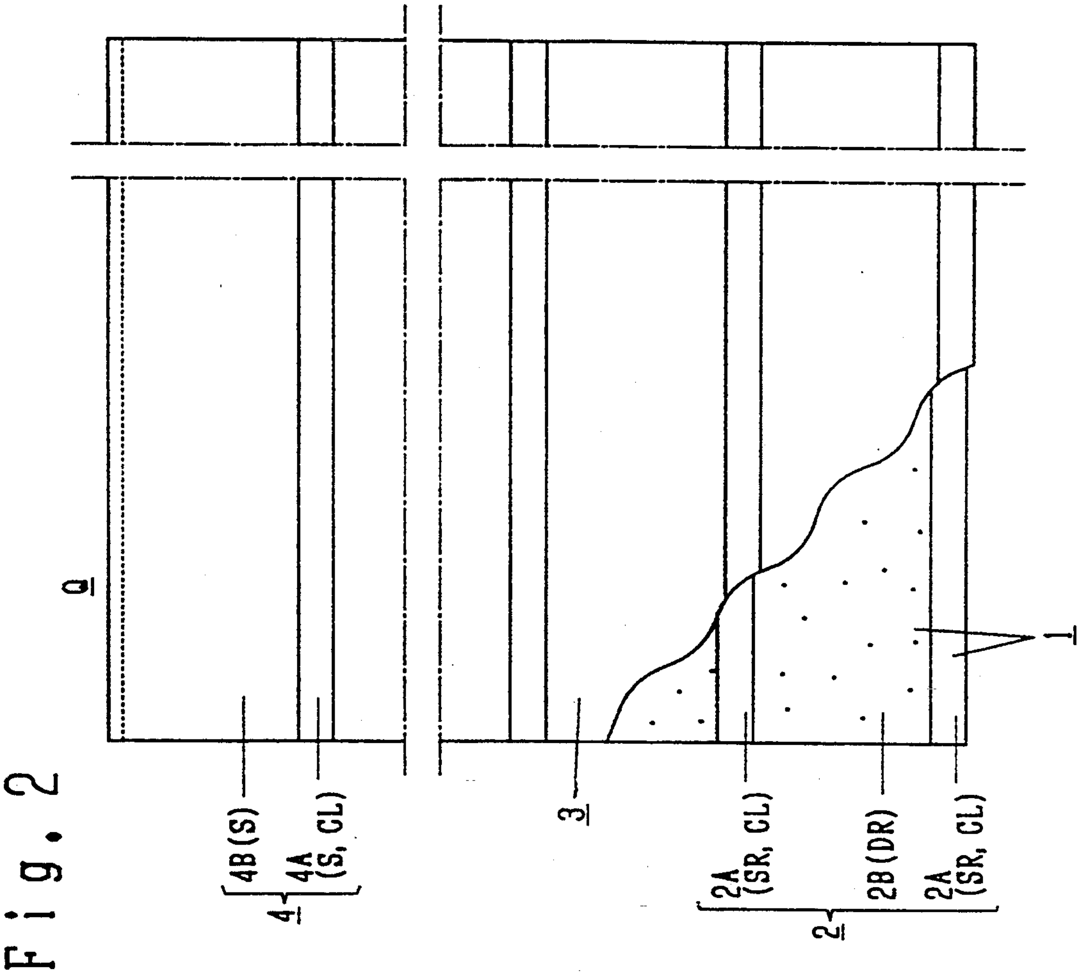
FIG. 2 is a front view, partly cut away, showing the first embodiment of the pseudo-luminous panel according to the present invention.
Figure 1:
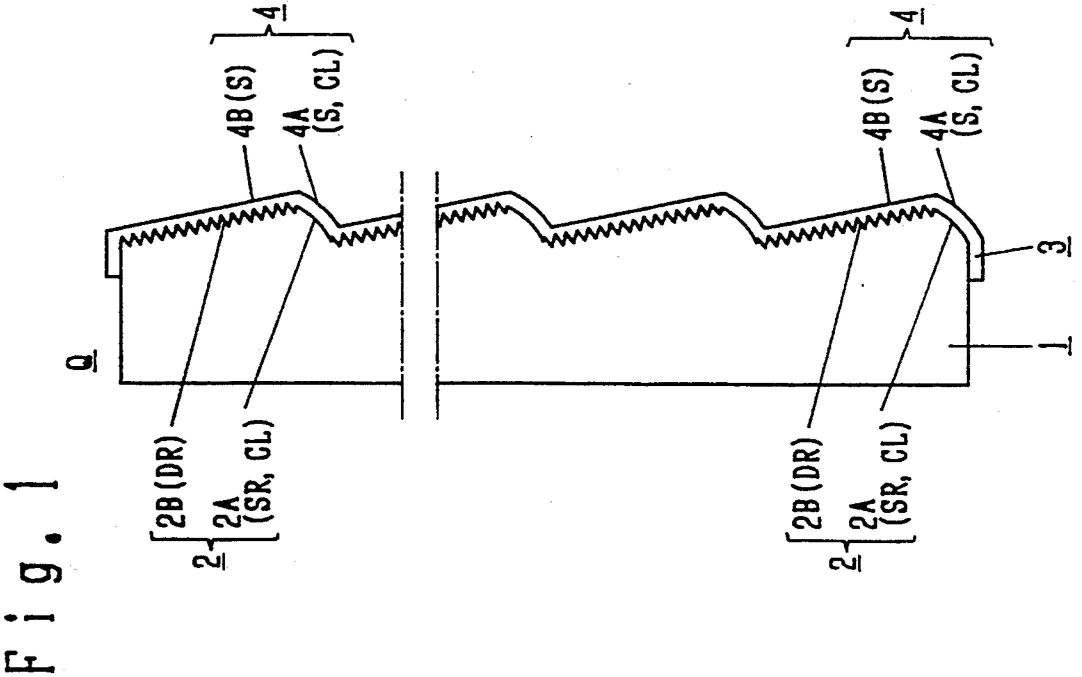
FIG. 1 is a longitudinal-sectional view schematically illustrating a first embodiment of the pseudo-luminous panel according to the present invention.

Referring now to FIGS. 1 and 2, a first embodiment of the pseudo-luminous panel Q according to the present invention will be described, which comprises a substrate 1 and a thin film optical color filter 3 coated all over the main surface 2 of the substrate 1.

The main surface 2 of the substrate 1 includes obliquely downward and upward band-like surface portions 2A and 2B which are alternately arranged side by side in the vertical direction. The obliquely downward band-like surface portions 2A are each formed by a smooth reflecting surface SR which is curved convexly downward and is straight namely flat widthwise of the panel Q as indicated by CL. The obliquely upward band-like surface portions 2B are each formed by an irregular reflecting surface DR or uneven reflecting surface UR which extends in a flat plane.

Obliquely downward band-like surface portions 4A of the surface 4 of the thin film optical color filter 3, formed on the obliquely downward band-like surface portions 2A of the substrate 1, are each formed by a smooth surface S which is curved convexly downward and extends straight widthwise of the panel Q in conformity with the underlying obliquely downward band-like surface portion 2A of the substrate 1 as indicated by CL. Obliquely band-like surface portions 4B of the surface 4 of the thin film optical color filter, formed on the obliquely downward band-like surface portions 2B of the substrate 1, are each formed by a smooth surface S as is the case with the obliquely downward band-like surface portions 4A of the filter 3.

Figure 3:
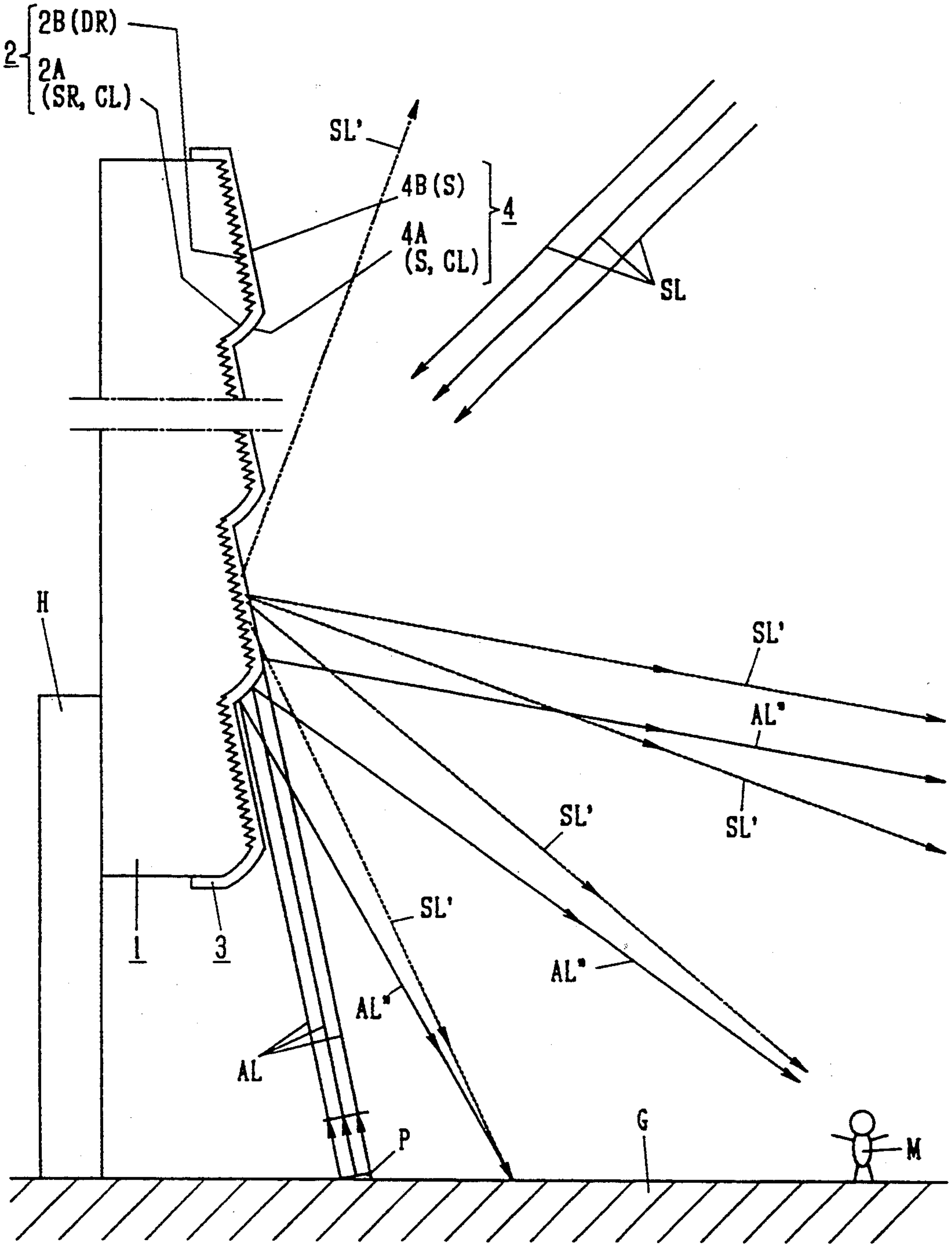
FIG. 3 is a schematic diagram for explaining the first embodiment depicted in FIGS. 1 and 2.

In the case where the pseudo-luminous panel Q of the above construction is disposed outdoors as shown in FIG. 3, sunlight SL directly strikes the obliquely upward band-like surface portions 4B of the color filter 2 but hardly falls on the obliquely downward band-like surface portions 4A of the color filter 3. In this case, the sunlight SL enters into the thin film optical color filter 3 through the surface portions 4B and then into the obliquely upward band-like surface portions 2B of the main surface 2 of the substrate 1. Since the surface portions 2B are each formed by the irregular reflecting surface DR or uneven reflecting surface UR, the sunlight SL is irregularly reflected in the surface portions 2B of the substrate 1. The irregularly reflected light passes again through the thin film optical color filter 3 and its obliquely upward band-like surface portions 4B and is then emitted as scattered light SL′ from the pseudo-luminous panel Q.

The scattered light SL′ has passed through the thin film optical color filter 3, and hence has a hue based on the pass band of the color filter 3 in terms of its band-pass characteristic. A portion of the scattered light SL′ is directed toward the ground G. Consequently, in the daytime a pattern on the main surface 2 of the substrate 1 can be seen from the ground G in the hue based on the pass band of the color filter 3.

By suitably selecting the position of the projector P relative to the pseudo-luminous panel Q for illumination with the artificial light AL at night, the artificial light AL mostly strikes the obliquely downward band-like surface portions 4A of the thin film optical color filter 4. The artificial light AL striking the surface portions 4A enters therefrom into the thin film optical color filter 3 and then into the obliquely downward band-like surface portions 2A of the substrate 1. In this instance, since the surface portions 2A are the smooth reflecting surfaces S, the incident light is hardly irregularly reflected and is reflected downwardly. The thus reflected light passes again through the color filter 3 and its obliquely downward band-like surface portions 4A and is emitted obliquely downward as directly reflected light AL″ from the pseudo-luminous panel Q.

The reflected light AL″ thus emitted diagonally below the panel Q has passed through the thin film optical color filter 3, and hence has a hue based on the pass band or band-pass characteristic of the color filter 3. Hence, a pattern on the main surface 3 of the substrate 1 can be seen at night from a position diagonally below the panel Q in the hue based on the pass band or band-pass characteristic of the color filter 3.

Figure 49:
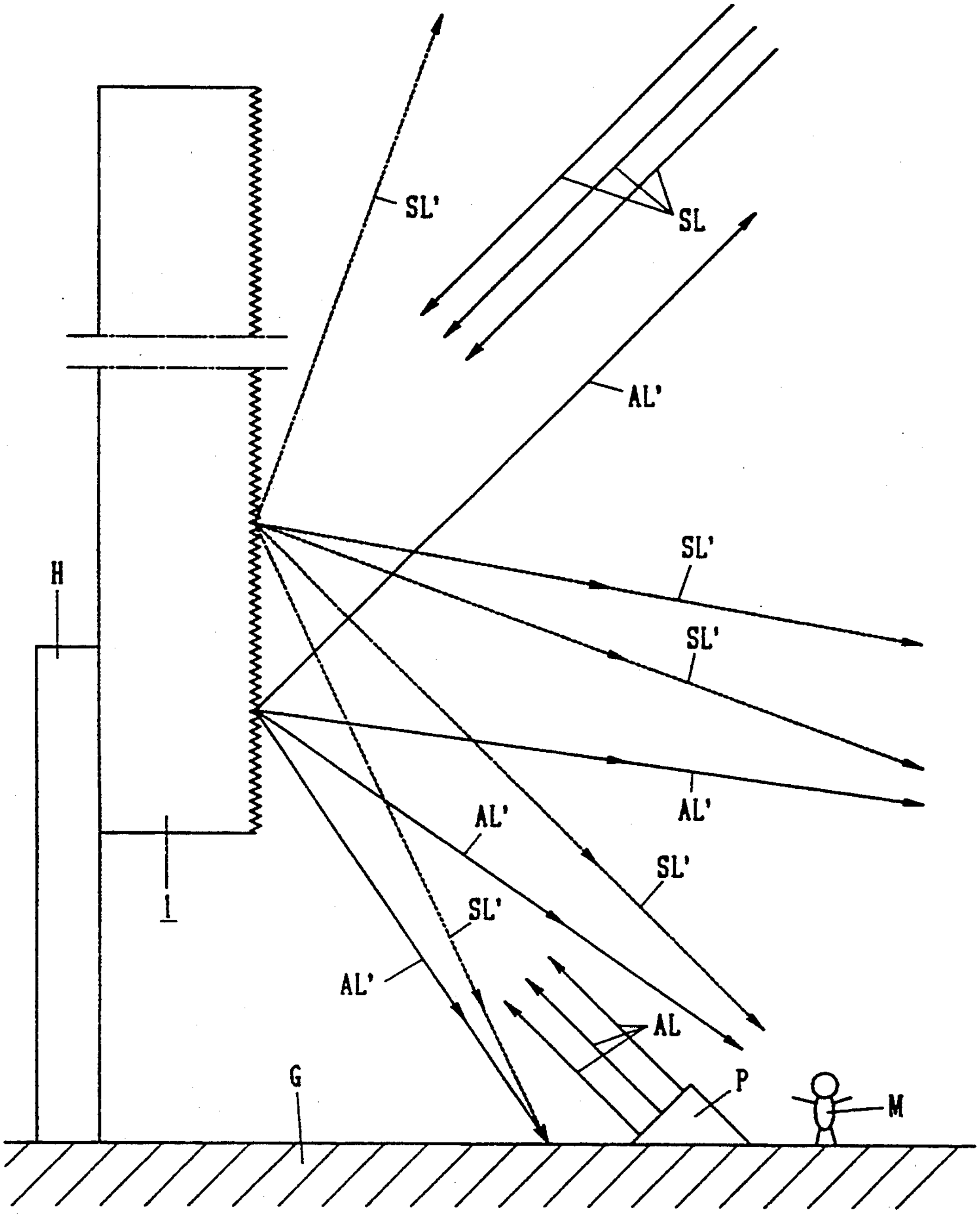
FIG. 49 is a schematic diagram for explaining the conventional pseudo-luminous panel.

Thus, according to the pseudo-luminous panel Q of the present invention depicted in FIGS. 1 and 2, when it is disposed high above the ground G so that it is irradiated by the sunlight SL in the daytime and by the artificial light AL at night, as shown in FIG. 49, the pattern on the main surface 2 of the substrate 1 can always be seen from the position diagonally below the panel Q in the hue based on the band-pass characteristic or pass band of the color filter 3.

As referred to previously, there is a great difference in energy between the sunlight SL and the artificial light AL which strike the pseudo-luminous panel Q. In the daytime the viewer M perceives the pattern on the main surface 2 of the substrate 1 by a portion of the scattered light SL′, whereas at night he sees the pattern by the directly or regularly reflected light AL″.

Consequently, when the reflectivity of the substrate 1 is made relatively high by a suitable selection of its material so that the pattern on the main surface of the substrate 1 can be seen distinctly at night, the pattern in the day time does not become dazzling and can be seen clearly in the hue based on the band-pass characteristic or pass band of the thin film optical color filter 3. Also when the reflectivity of the substrate 1 is made low by a suitable selection of its material so that the pattern on the main surface 2 of the substrate 1 is not dazzling in the daytime, the pattern can clearly be seen at night in the hue based on the band-pass characteristic or pass band of the color filter 3.

Furthermore, the obliquely downward band-like surface portions 2A forming the main surface 2 of the substrate 1 are each formed by the smooth reflecting surface SR, which is convex downward and is straight namely flat widthwise of the panel Q as mentioned previously. With such a structure, the reflected light AL″ emerging from the panel Q spreads in the vertical direction as shown in FIG. 3. Hence, it is possible to essentially avoid limitations on the area in front of the panel where the pattern on the main surface 2 of the substrate 1 can be viewed distinctly at night, by properly selecting the curvature and shape of the convexly protruding surface CL.

Moreover, with the above structure, the reflected light AL″ does not unnecessarily spread in the lateral direction, and consequently, the area diagonally to the front of the panel Q where the pattern on the main surface 2 of the substrate 1 can be seen is limited to some extent, but the pattern can be viewed distinctly from such a modestly limited area.

In the case of the pseudo-luminous panel Q of this embodiment, the substrate 1 can be made substantially hard but may also be fabricated as a flexible sheet, hence the pseudo-luminous panel Q can be provided as a flexible sheet. Accordingly, the pseudo-luminous panel Q can be rolled up when it is not used. When it is used outdoors as mentioned previously, it needs only to be put up on a support frame or the like. Since the flexible pseudo-luminous panel Q can be held in the rolled-up form and hence is easy to handle when it is not used.

Embodiment 2

Figure 5:
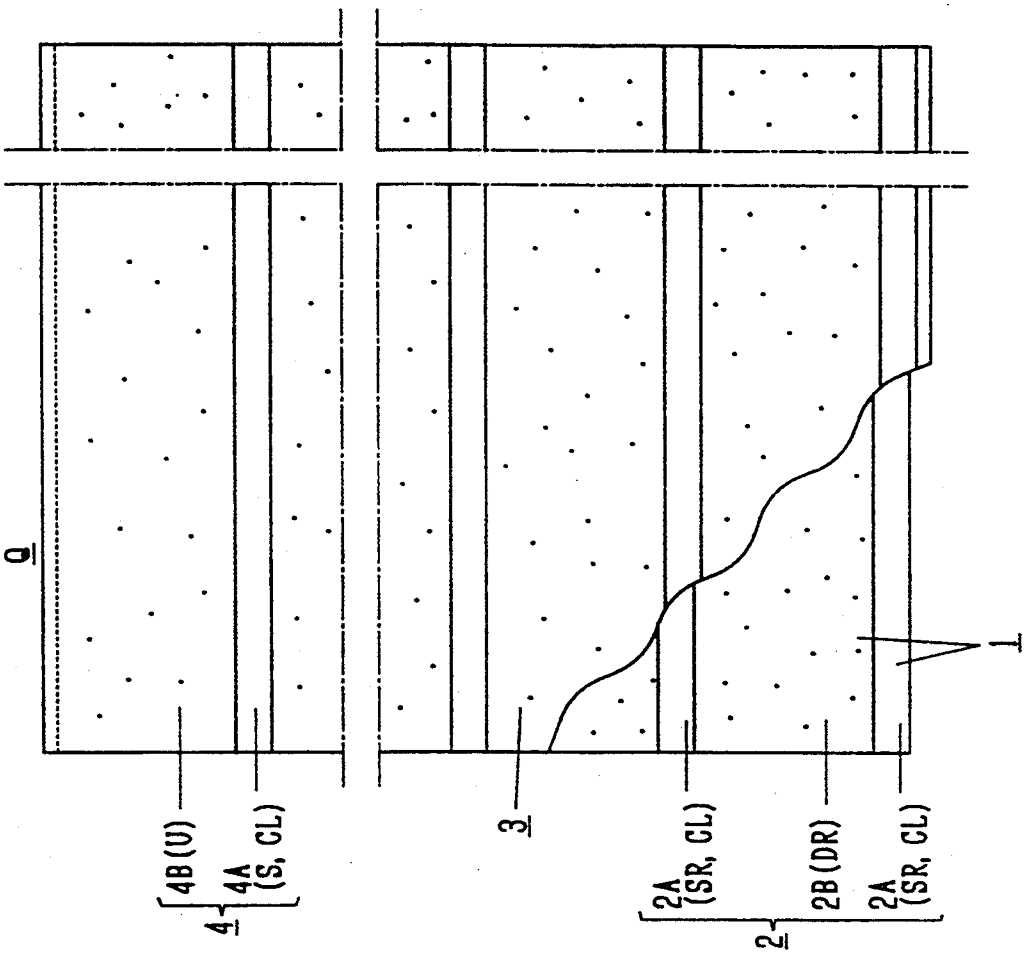
FIG. 5 is a front view, partly cut away, schematically showing the second embodiment of the present invention.
Figure 4:
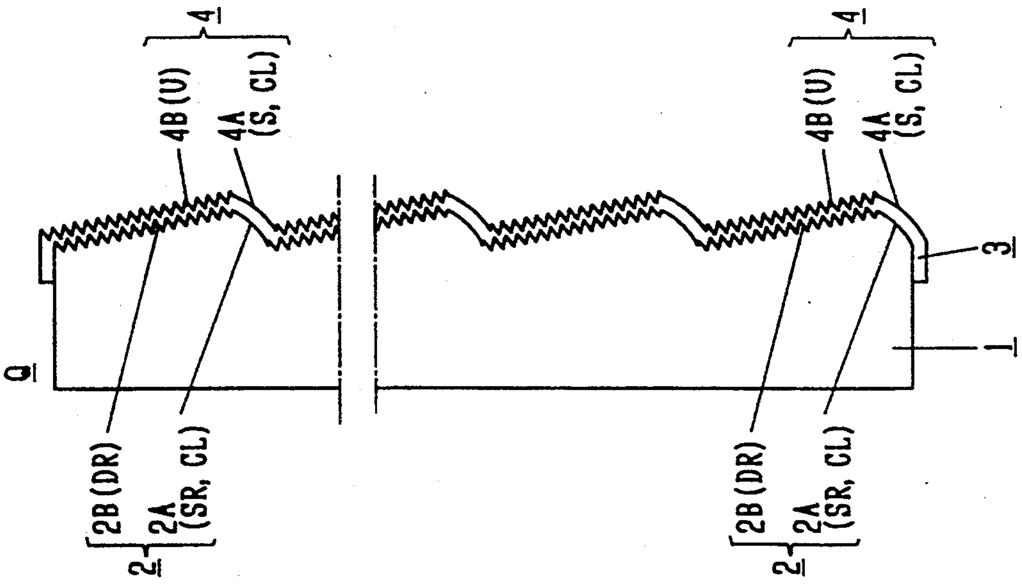
FIG. 4 is a longitudinal-sectional view schematically illustrating a second embodiment of the pseudo-luminous panel according to the present invention.

Turning next to FIGS. 4 and 5, a second embodiment of the pseudo-luminous panel Q according to the present invention will be described. The parts corresponding to those in FIGS. 1 and 2 are identified by the same reference numerals and no detailed description thereof will be repeated.

The pseudo-luminous panel Q of this example is identical in construction with the first embodiment except that the obliquely upward band-like surface portions 4B of the thin film optical color filter 3 are each formed by an uneven surface U, not the smooth surface S extending in the flat plane in the first embodiment.

With the pseudo-luminous panel Q of such a structure, it is possible to obtain the same results as those obtainable with the first embodiment described above in respect of FIGS. 1 and 2.

In this embodiment, however, since the obliquely upward band-like surface portions 4B of the thin film optical color filter 3 are each formed by the uneven surface U, the sunlight SL incident on the color filter 3 irregularly enters thereinto and is irregularly reflected by the obliquely upward band-like surface portions 2B of the main surface 2 of the substrate 1 back to the front of the panel Q through the color filter 3, thereafter being irregularly emitted from the panel Q. In this case, the scattered light SL' is more scattered than in the case of the first embodiment.

Consequently, even if in the case of the panel Q the first embodiment the pattern on the substrate 1 is dazzling owing to relatively high intensity of the sunlight SL in the daytime, it is possible, with the panel Q of this embodiment, that the pattern is perceived by the viewer M in the hue based on the bandpass characteristic or pass band of the color filter 3, without dazzling.

Embodiment 3

Figure 7:
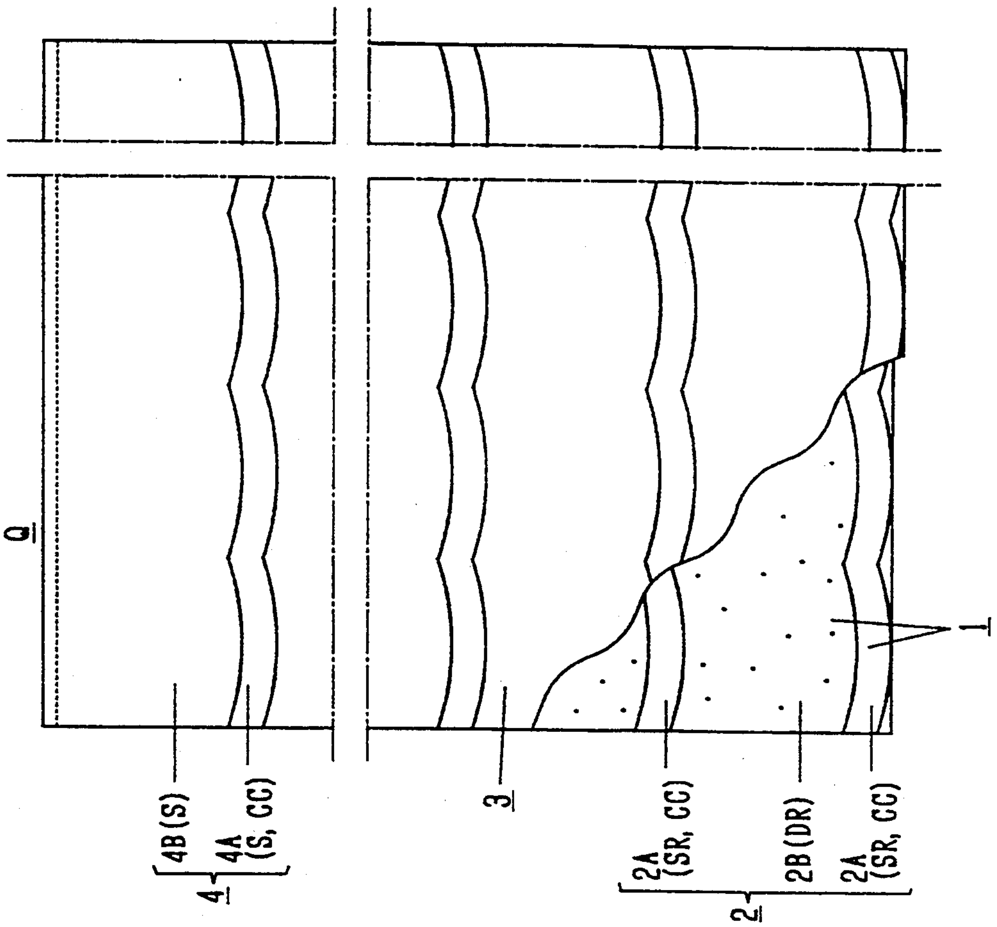
FIG. 7 is a schematic front view, partly cut away, showing the third embodiment of the present invention.
Figure 6:
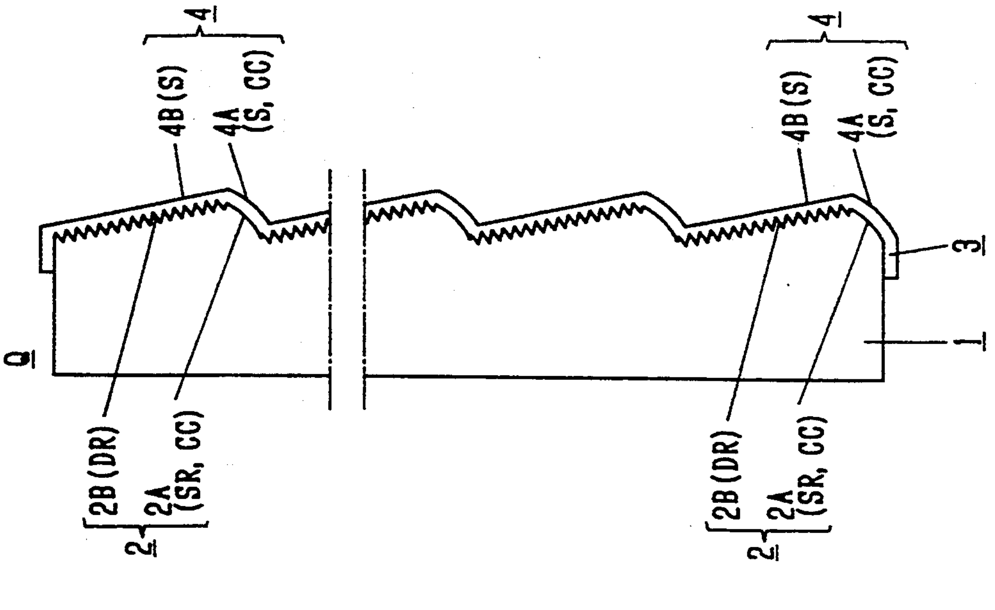
FIG. 6 is a longitudinal-sectional view schematically illustrating a third embodiment of the pseudo-luminous panel according to the present invention.

Referring now to FIGS. 6 and 7, a third embodiment of the pseudo-luminous panel Q according to the present invention will be described. The parts corresponding to those in FIGS. 1 and 2 are identified by the same reference numerals and no detailed description thereon will be repeated.

The pseudo-luminous panel Q of this embodiment is identical in construction except that in the latter the obliquely downward band-like surface portions 2A of the substrate 1 are each formed by the smooth reflecting surface SR which is convex downward and is straight, namely flat widthwise of the substrate 1 as indicated by CL, whereas in the former the surface portions 2A are each formed by a smooth surface S which is convex downward and is convex forward at regular intervals widthwise of the substrate 1 as indicated by CC.

It is evident that the pseudo-luminous panel Q of this embodiment produces, the same effects as those obtainable with the embodiment shown in FIGS. 1 and 2, though not described in detail.

Figure 8:
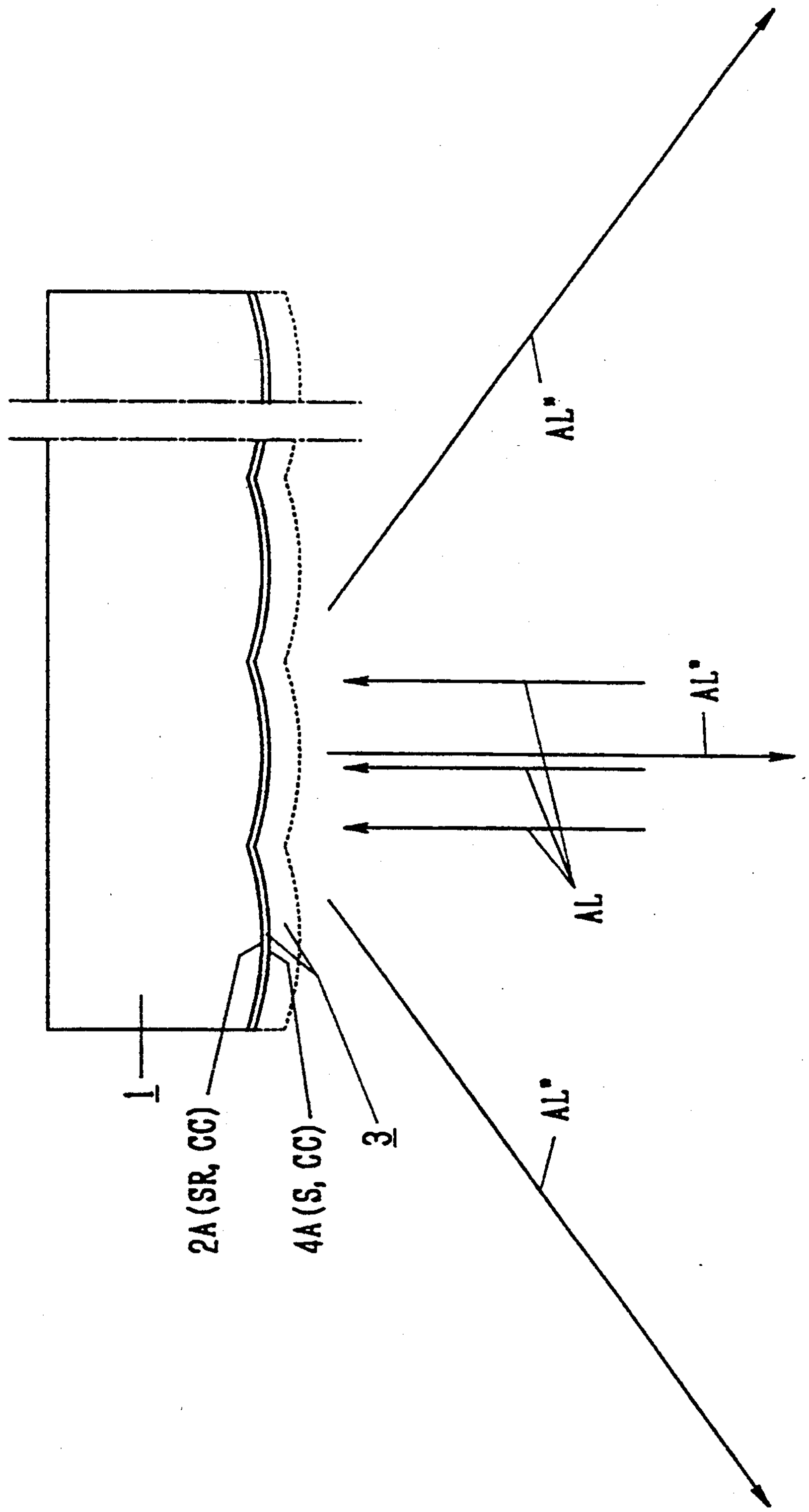
FIG. 8 is a schematic diagram for explaining the third embodiment depicted in FIGS. 6 and 7.

In this embodiment, since the obliquely downward band-like surface portions 2A forming the main surface 2 of the substrate 1 are each the smooth surface S which is convex downward and is convex forward at regular intervals widthwise of the substrate 1 as indicated by CC, the reflected light AL'' emerging forwardly downward from the panel Q spreads to the right and left, i.e. in the lateral or widthwise direction of the panel Q, as shown in FIG. 8. By properly selecting the shape of each of the discontinuous convexities of the surface CC, the area from which the pattern on the main surface 2 of the substrate 1 can be seen can be widened in the lateral direction relative to the panel Q.

Embodiment 4

Figure 10:
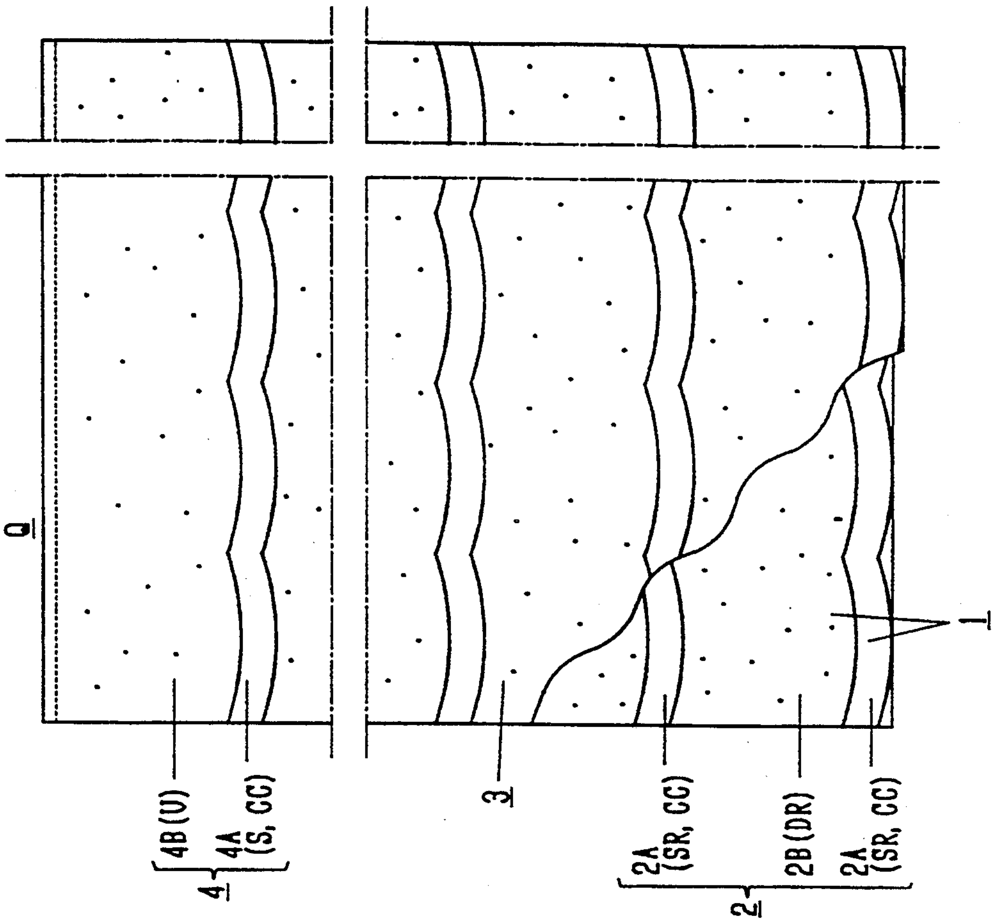
FIG. 10 is a schematic front view, partly out away, showing the fourth embodiment of the present invention.
Figure 9:
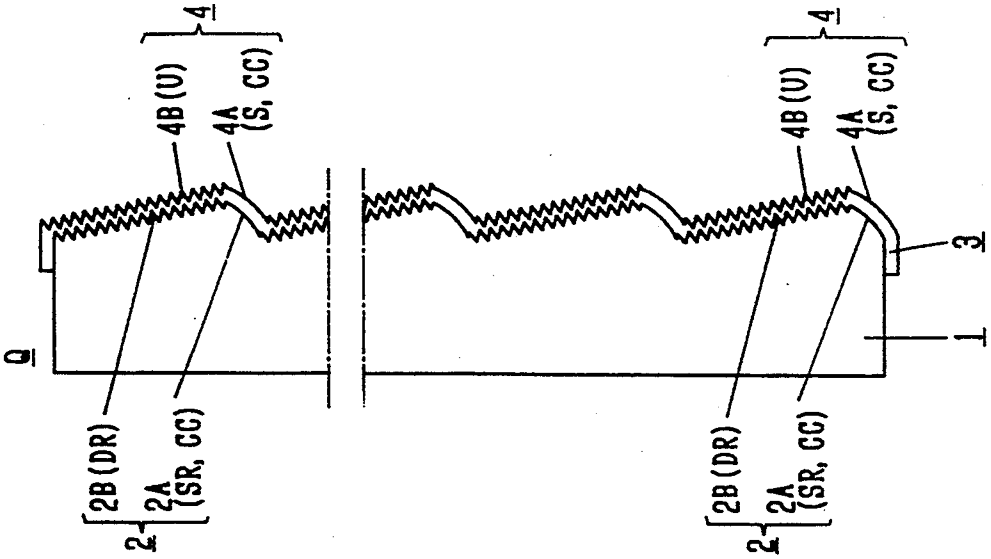
FIG. 9 is a longitudinal-sectional view schematically illustrating a fourth embodiment of the pseudo-luminous panel according to the present invention.

With reference to FIGS. 9 and 10, a fourth embodiment of the pseudo-luminous panel Q according to the present invention will be described.

The pseudo-luminous panel Q of this embodiment is identical in construction with the panel of the third embodiment except that in the latter the obliquely upward band-like surface portions 4B of the thin film optical color filter 3 are each formed by the smooth surface S, whereas in the former the surface portions 4B are each formed by the uneven surface U as in the case of the second embodiment described above in respect of FIGS. 4 and 5.

It is evident that the pseudo-luminous panel Q of this embodiment produces the same effects as those obtainable with the panels Q of the second and third embodiments described previously in connection with FIGS. 4 and 5 and 6 and 7, respectively.

Embodiment 5

Figure 12:
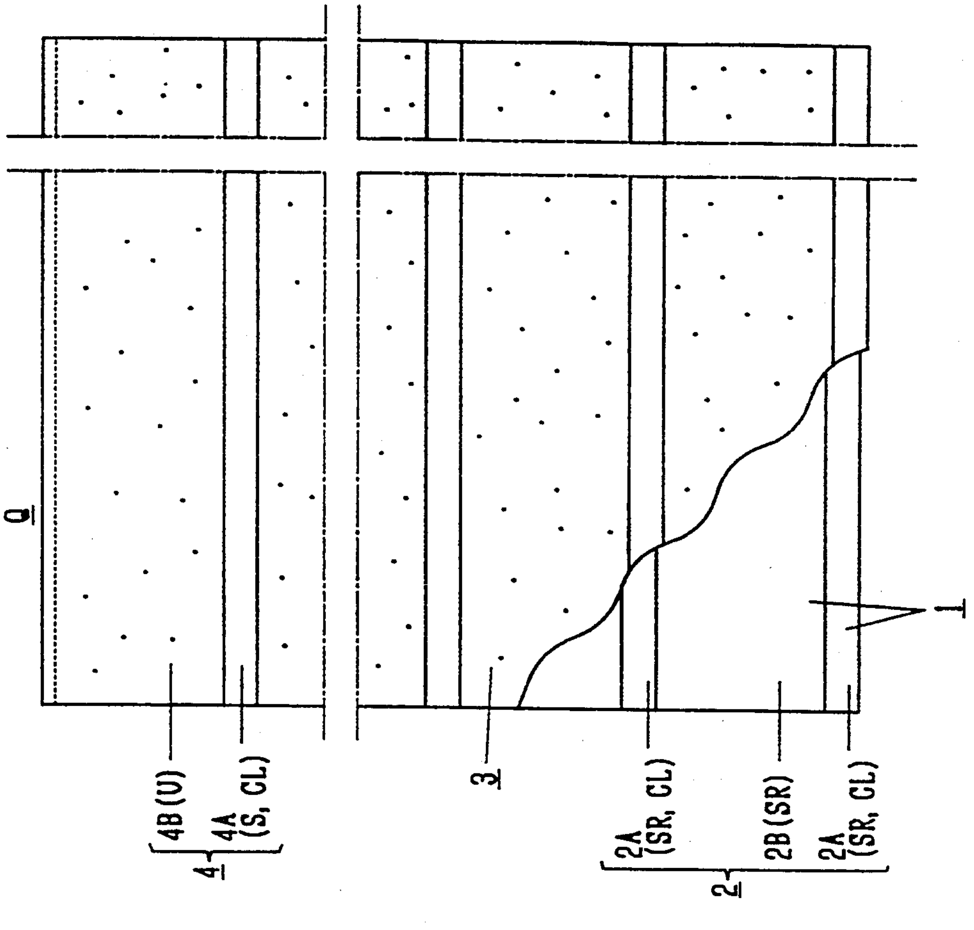
FIG. 12 is a schematic front view, partly cut away, showing the fifth embodiment of the present invention.
Figure 11:
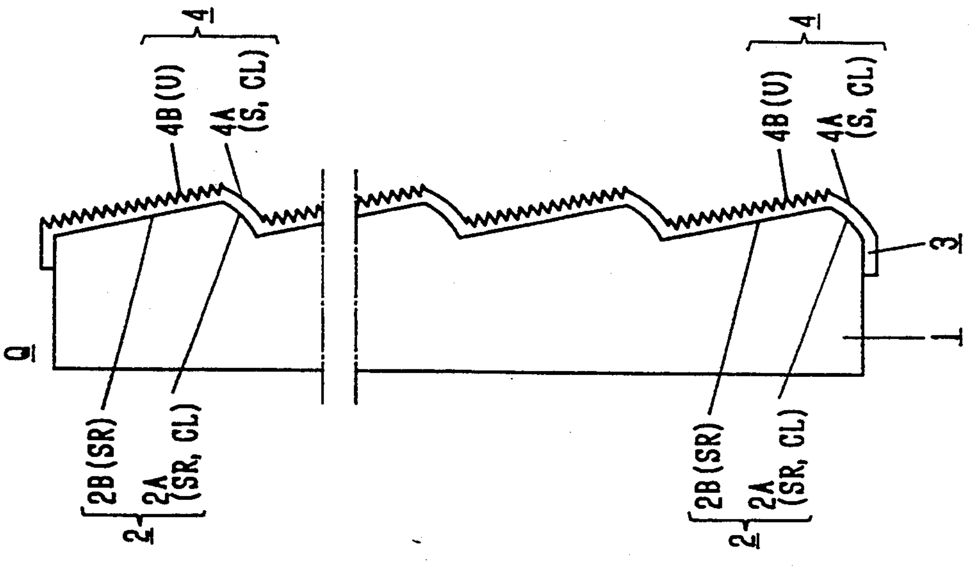
FIG. 11 is a longitudinal-sectional view schematically illustrating a fifth embodiment of the pseudo-luminous panel according to the present invention.

Turning next to FIGS. 11 and 12, a fifth embodiment of the pseudo-luminous panel Q according to the present invention. The parts corresponding to those in FIGS. 4 and 5 are identified by the same reference numerals and no detailed description will be given thereof.

The pseudo-luminous panel Q of this embodiment is identical in construction with the second embodiment of FIGS. 4 and 5 except that in the latter the obliquely upward band-like surface portions 2B of the substrate 1 are each formed by the irregular reflecting surface DR or uneven reflecting surface UR, whereas in the former the surface portions 2B are each formed by the smooth reflecting surface SR.

In the pseudo-luminous panel Q of this embodiment the obliquely upward band-like surface portions 2B of the substrate 1 are each formed by the smooth reflecting surface SR but since the obliquely upward band-like surface portions 4B of the thin film optical color filter 3 are each formed by the uneven surface U, the same effects as those obtainable with the second embodiment of FIGS. 4 and 5 can be produced by the pseudo-luminous panel Q of this embodiment.

Embodiment 6

Figure 14:
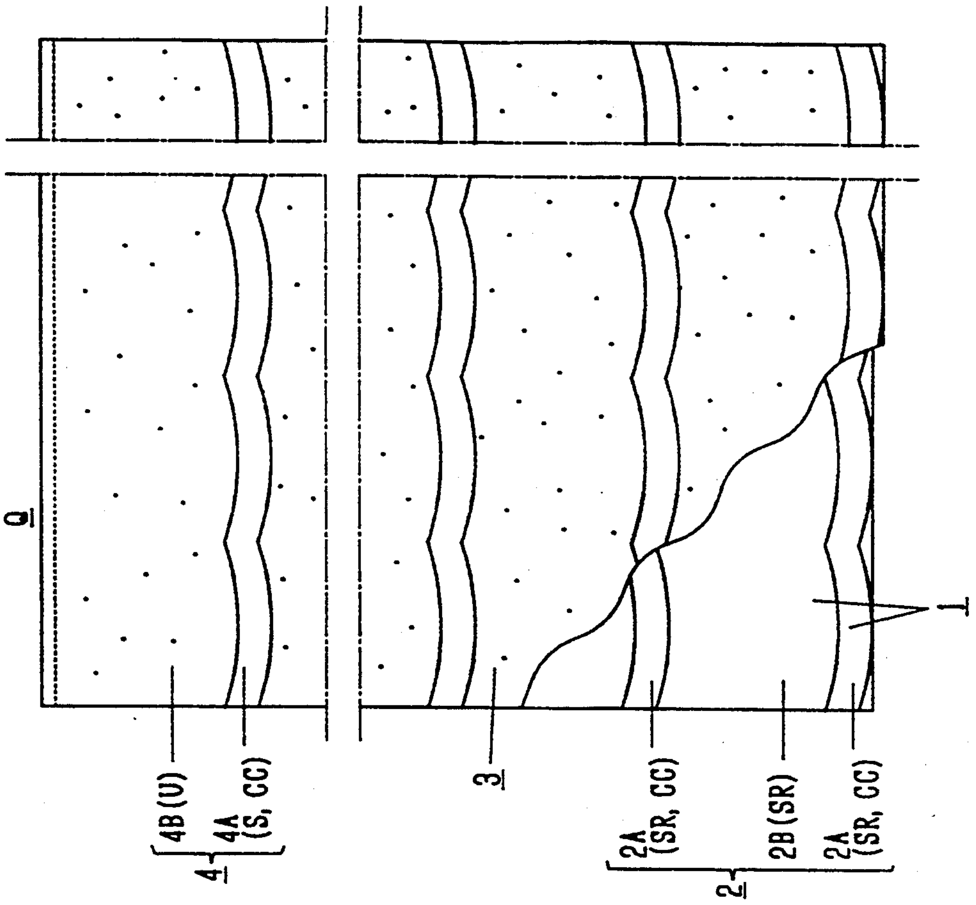
FIG. 14 is a schematic front view, partly cut away, showing the sixth embodiment of the present invention.
Figure 13:
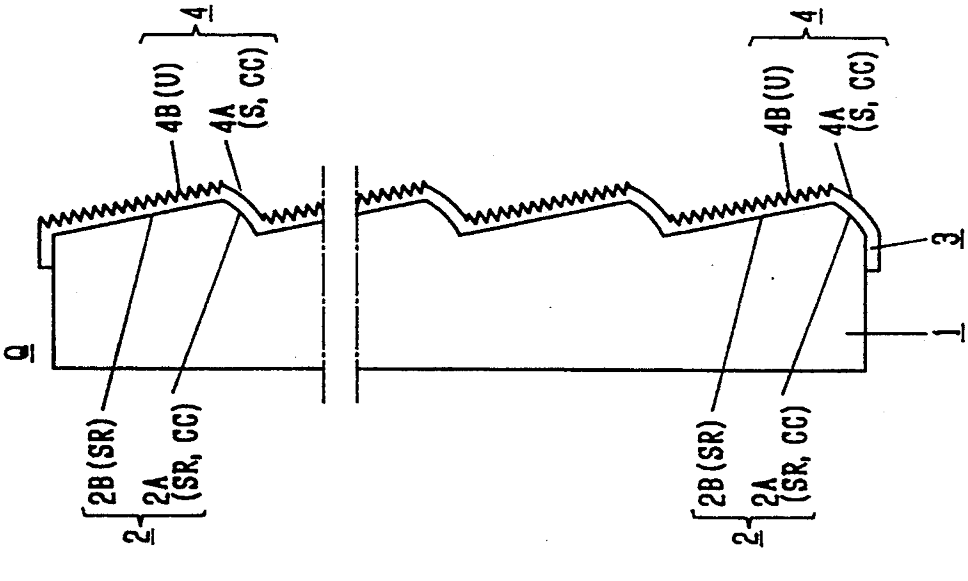
FIG. 13 is a longitudinal-sectional view schematically illustrating a sixth embodiment of the pseudo-luminous panel according to the present invention.

Referring next to FIGS. 13 and 14, a sixth embodiment of the pseudo-luminous panel Q of the present invention will be described. The parts corresponding to those in FIGS. 9 and 10 are identified by the same reference numerals and no detailed description will be given thereof.

The pseudo-luminous panel Q of this embodiment is identical in construction with the fourth embodiment of FIGS. 9 and 10 in that in the latter the obliquely upward band-like surface portions 2B of the substrate 1 are each formed by the irregular reflecting surface DR or uneven reflecting surface UR extending in a plane, whereas in the former the surface portions 2B are each formed by the smooth reflecting surface SR as in the fifth embodiment described above with respect to FIGS. 11 and 12.

Hence it is possible, with the pseudo-luminous panel Q of such a structure, to obtain the same results as those obtainable with the fourth embodiment of FIGS. 9 and 10 and the fifth embodiment of FIGS. 11 and 12.

Embodiment 7

Figure 16:
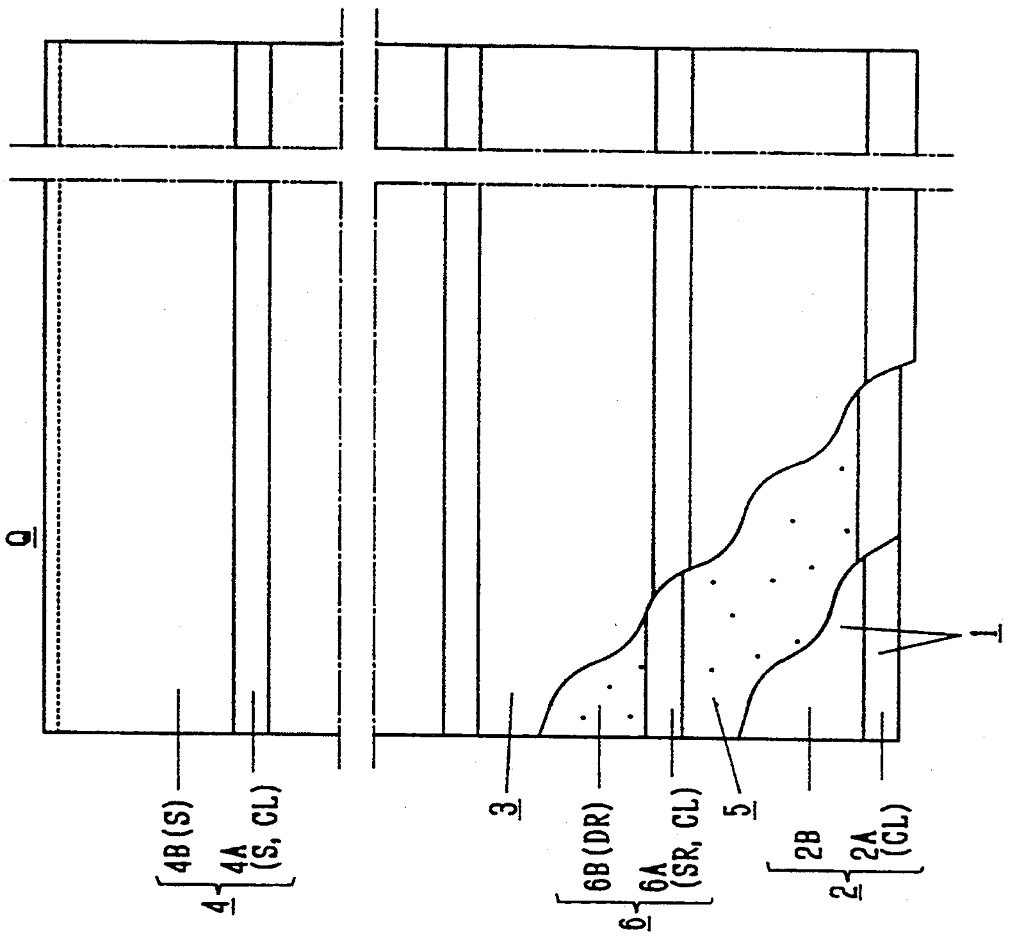
FIG. 16 is a schematic front view, partly cut away, showing the seventh embodiment of the present invention.
Figure 15:
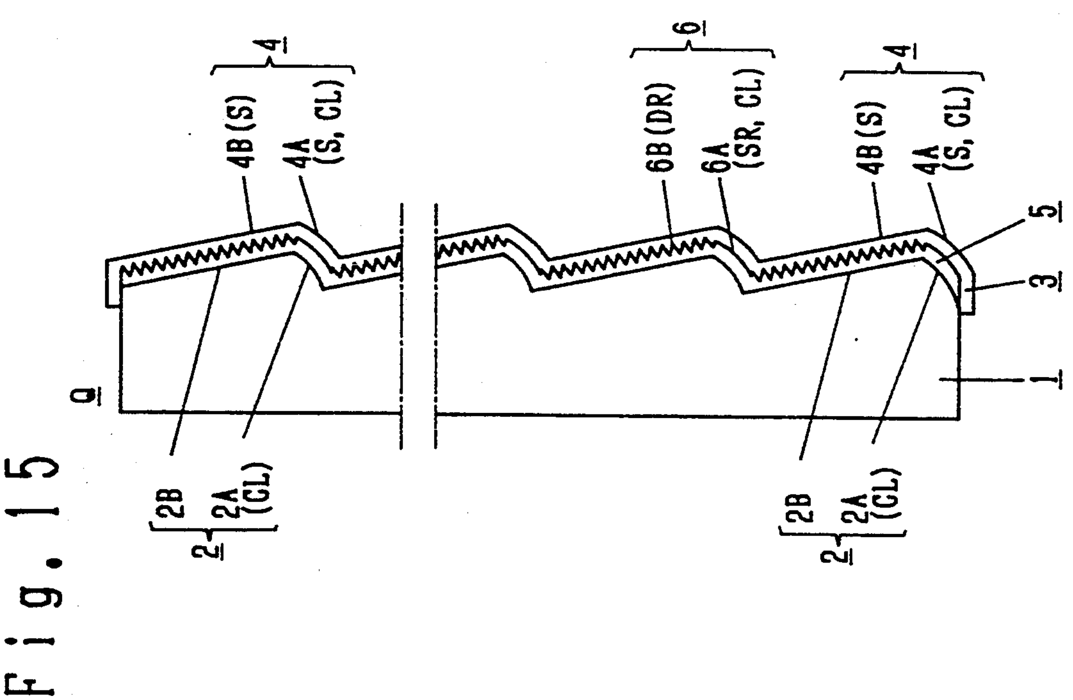
FIG. 15 is a longitudinal-sectional view schematically illustrating a seventh embodiment of the pseudo-luminous panel according to the present invention.

Referring now to FIGS. 15 and 16, a seventh embodiment of the pseudo-luminous panel Q according to the present invention will be described. The parts corresponding to those in FIGS. 1 and 2 are identified by the same reference numerals and no detailed description will be given thereof.

The pseudo-luminous panel Q of this embodiment comprises the substrate 1, a reflecting film 5 coated all over the main surface 2 of the substrate 1, and the thin film optical color filter 3 coated all over the surface 6 of the reflecting film 5 on the opposite side from the substrate 1.

As is the case with the first embodiment described previously in respect of FIGS. 1 and 2, the main surface 2 of the substrate 1 has the obliquely downward band-like surface portions 2A and the obliquely upward band-like surface portions 2B alternately arranged side by side in the vertical direction.

The surface portions 2A are each formed by the smooth surface S or uneven U, which is convex downward and is straight namely flat widthwise of the substrate 1 as indicated by CL.

The surface portions 2B are each formed by the smooth surface S or uneven surface U which extends in a plane.

Obliquely downward band-like surface portions 6A on the corresponding similarly shaped surface portions 2A of the substrate 1, forming the surface 6 of the reflecting film 5 on the opposite side from the substrate 1 are each formed by the smooth reflecting surface SR as in the first embodiment described in conjunction with FIGS. 1 and 2, and the surface SR is convex downward and is straight namely flat widthwise of the substrate 1 in conformity with the underlying the surface portion 2A of the substrate 1 as indicated by CL.

The obliquely upward band-like surface portions 6B on the similarly shaped surface portions 2B of the substrate 2, forming the surface 6 of the reflecting film 5 on the opposite side from the substrate 1, are each formed by the irregular reflecting surface DR or uneven reflecting surface UR extending in a plane as in the case of the first embodiment shown in FIGS. 1 and 2.

The obliquely downward band-like surface portions 4A on the similarly shaped surface portions 6A of the reflecting film 5, forming the surface 4 of the thin film optical color filter 3 on the opposite side from the reflecting film 5, are each formed by the smooth surface S, which is convex downward and is straight, namely flat widthwise of the panel in conformity with the underlying the surface portion 6A as indicated by CL.

Furthermore, the obliquely upward band-like surface portions 4B on the similarly shaped surface portions 6B of the reflecting film 5, forming the surface 4 of the thin film optical color filter 3 on the opposite side from the reflecting film 5, are each formed by the smooth surface S as is the case with the obliquely downward band-like surface portion 4A of the filter 3.

With the pseudo-luminous panel Q of this embodiment, since the surface 6 of the reflecting film 5 is exactly the same as the main surface 2 of the substrate 1 in the pseudo-luminous panel Q of the first embodiment, it is possible to obtain the same effects as those obtainable with the first embodiment.

Embodiment 8

Figure 17:
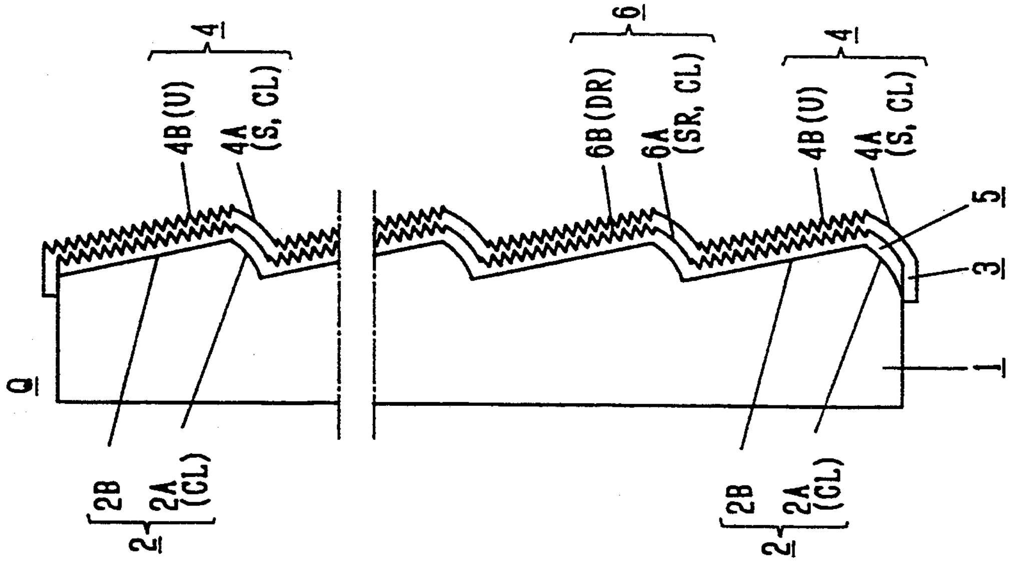
FIG. 17 is a longitudinal-sectional view schematically illustrating an eighth embodiment of the pseudo-luminous panel according to the present invention.
Figure 18:
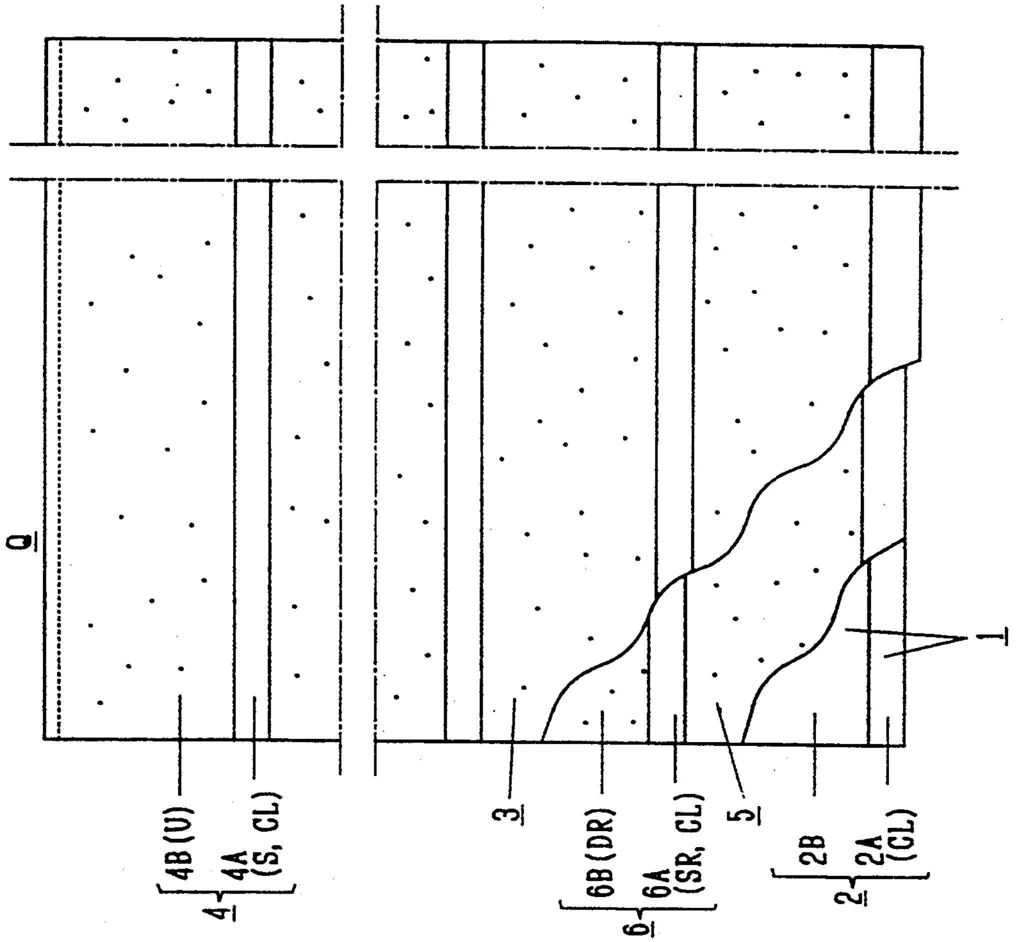
FIG. 18 is a schematic front view, partly cut away, showing the eighth embodiment of the present invention.

Turning next to FIGS. 17 and 18, an eighth embodiment of the pseudo-luminous panel Q according to the present invention will be described. The parts corresponding to those in FIGS. 15 and 16 are identified by the same reference numerals and no detailed description will be given thereof.

The pseudo-luminous panel Q of this embodiment is identical in construction with the seventh embodiment except that in the latter the obliquely upward band-like surface portions 4B of the thin film optical color filter 3 are each formed the smooth surface S extending in a plane, whereas in the former the surface portions 4B are each formed by the uneven surface U extending in a plane as in the case of the pseudo-luminous panel Q described previously with respect to FIGS. 4 and 5.

It is evident that the pseudo-luminous panel of the above structure produces the same effects as those obtainable with the embodiment of FIGS. 15 and 16 and the embodiment of FIGS. 4 and 5.

Embodiment 9

Figure 20:
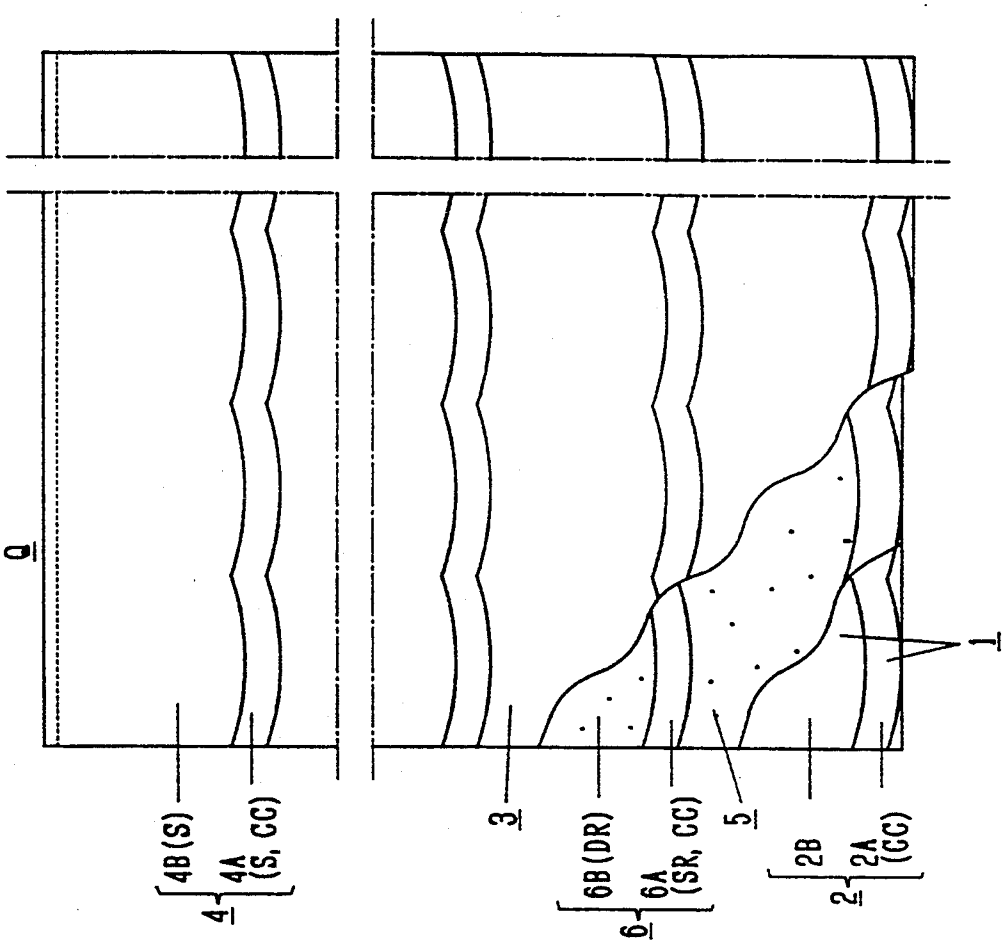
FIG. 20 is a schematic front view, partly cut away, showing the ninth embodiment of the present invention.
Figure 19:
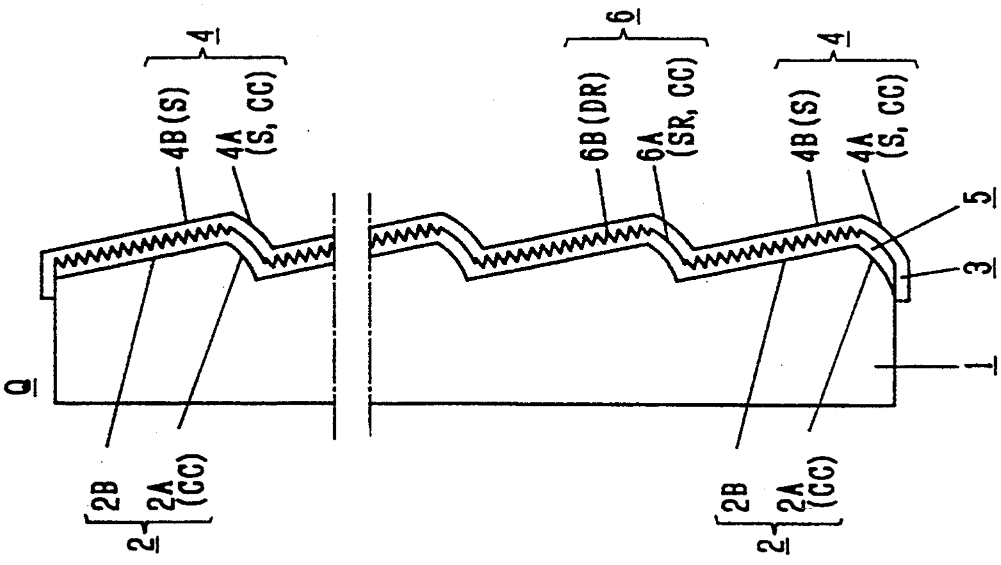
FIG. 19 is a longitudinal-sectional view schematically illustrating an ninth embodiment of the pseudo-luminous panel according to the present invention.

Referring next to FIGS. 19 and 20, a ninth embodiment of the pseudo-luminous panel Q according to the present invention will be described. The parts corresponding to those in FIGS. 15 and 16 are identified by the same reference numerals and no detailed description will be given thereof.

The pseudo-luminous panel Q of this embodiment is identical in construction with the seventh embodiment except that in the latter the obliquely downward band-like surface portions 6A of the reflecting film 5 are each formed by the smooth reflecting surface SR which is convex downward and is straight namely flat widthwise of the panel as indicated by CL, whereas in the former the surface portions 6A are each formed by the smooth reflecting surface SR which is convex downward and whose convexity is discontinuous at regular intervals widthwise of the panel as indicated by CC as in the third embodiment of FIGS. 6 and 7.

It is therefore evident that the pseudo-luminous panel Q of this embodiment brings the same effects as those by the embodiment of FIGS. 15 and 16 and the embodiment of FIGS. 6 and 7.

Embodiment 10

Figure 22:
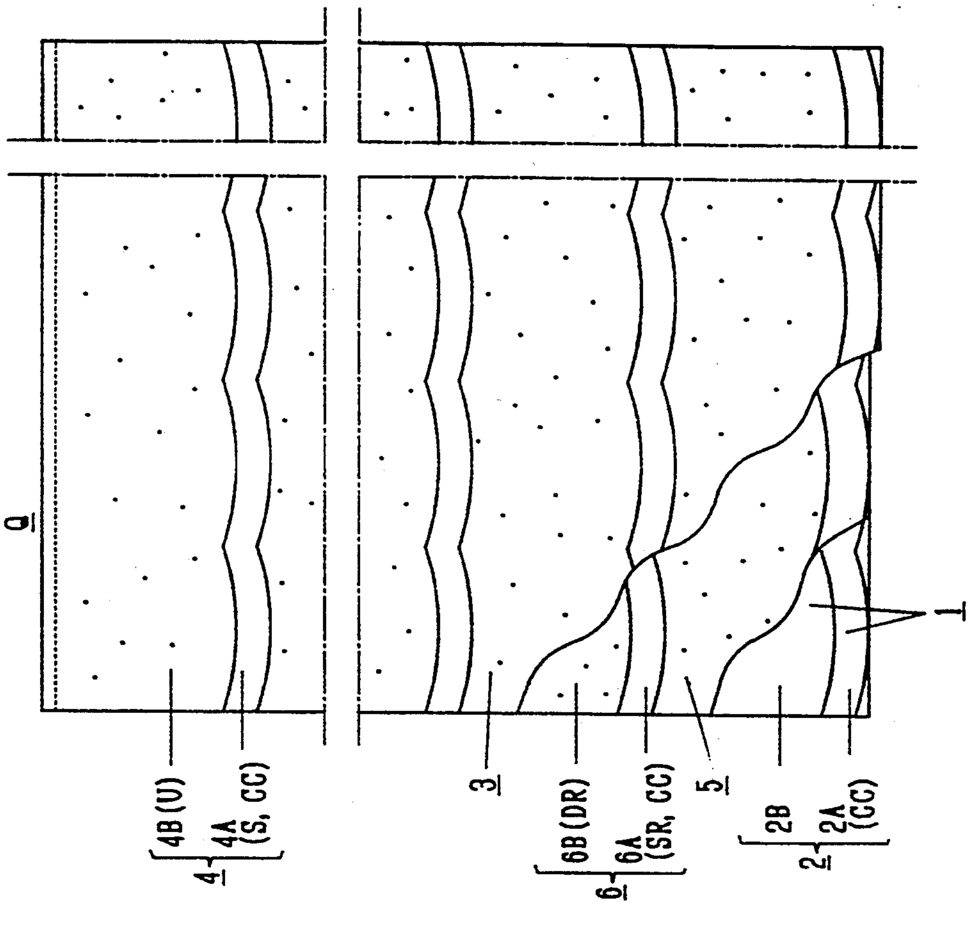
FIG. 22 is a schematic front view, partly cut away, showing the tenth embodiment of the present invention.
Figure 21:
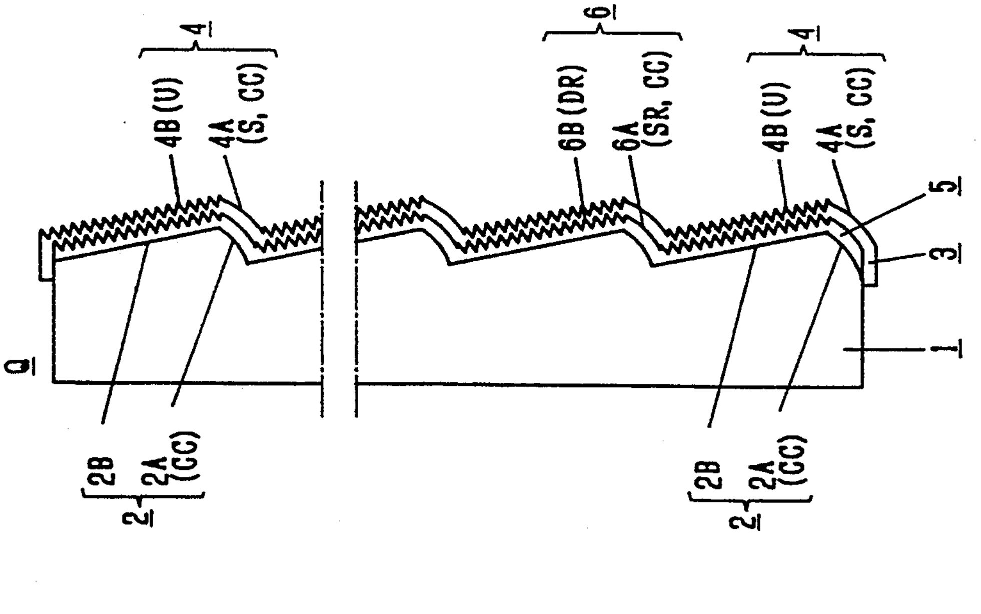
FIG. 21 is a longitudinal-sectional view schematically illustrating a tenth embodiment of the pseudo-luminous panel according to the present invention.

Turning next to FIGS. 21 and 22, a tenth embodiment of the pseudo-luminous panel Q according to the present invention will be described. The parts corresponding to those in FIGS. 19 and 20 are identified by the same reference numerals and no detailed description will be given thereof.

The pseudo-luminous panel Q of this embodiment is identical in construction with the ninth embodiment except that in the latter the obliquely upward band-like surface portions 4B of the thin film optical color filter 3 are each formed by the smooth surface S extending in a plane, whereas in the former the surface portions 4B are each formed by the uneven surface U as in the case of the eighth embodiment described previously in connection with FIGS. 17 and 18.

Hence it is evident that the pseudo-luminous panel Q of the above structure brings the same effects as those by the ninth embodiment of FIGS. 19 and 20 and the eighth embodiment of FIGS. 17 and 18.

Embodiment 11

Figure 24:
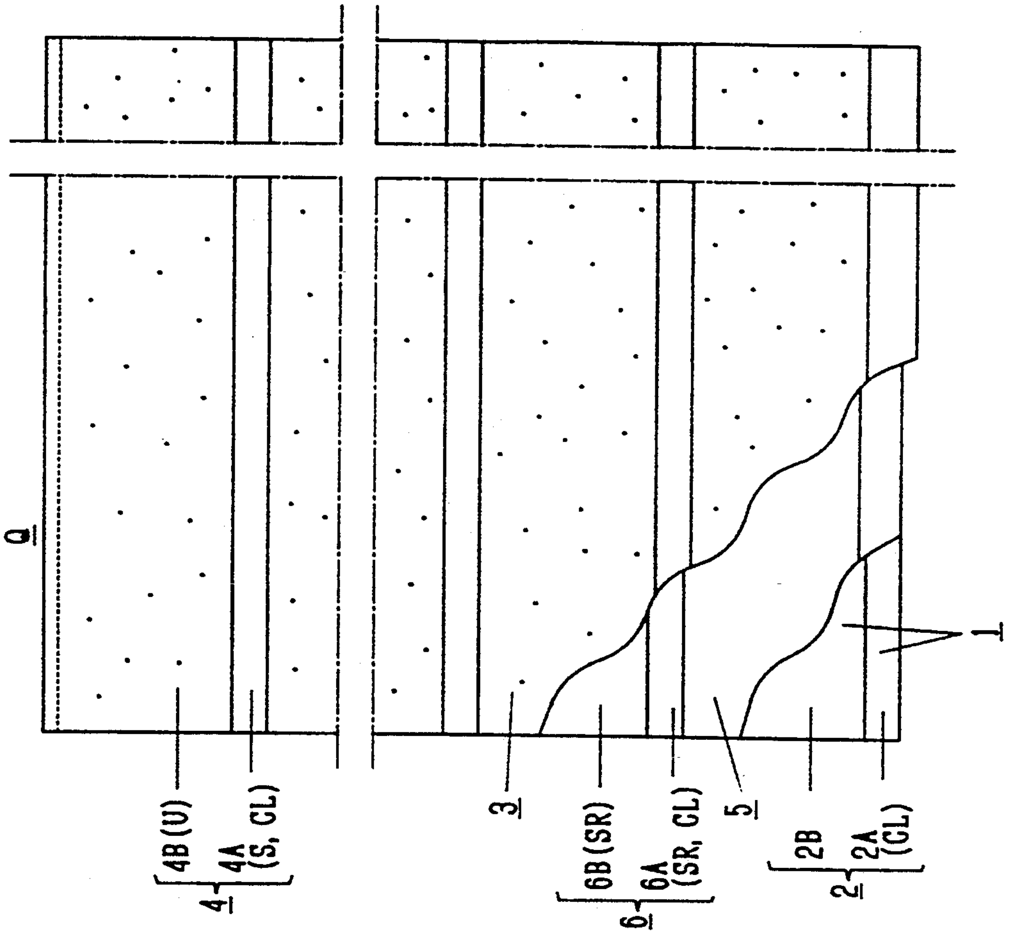
FIG. 24 is a schematic front view, partly cut away, showing the eleventh embodiment of the present invention.
Figure 23:
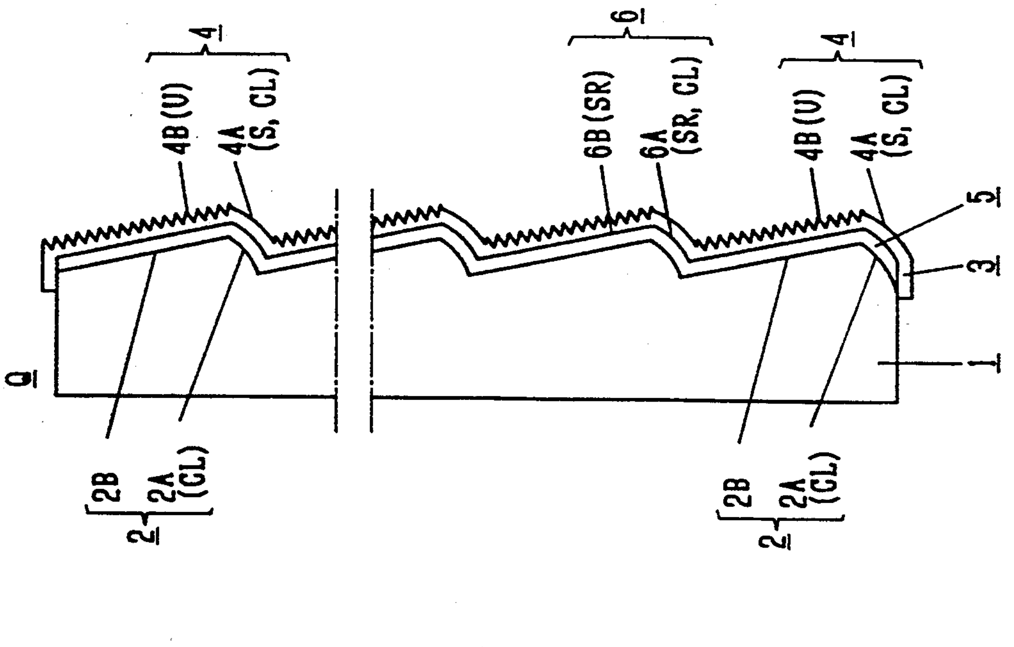
FIG. 23 is a longitudinal-sectional view schematically illustrating an eleventh embodiment of the pseudo-luminous panel according to the present invention.

Turning now to FIGS. 23 and 24, an eleventh embodiment of the pseudo-luminous panel Q according to the present invention will be described. The parts corresponding to those in FIGS. 17 and 18 are identified by the same reference numerals and no detailed description will be given thereof.

The pseudo-luminous panel Q of this embodiment is identical in construction with the eighth embodiment except that in the latter the obliquely upward band-like surface portions 6B of the reflecting film 5 are each formed by the irregular reflecting surface DR or uneven reflecting surface UR extending in a plane, whereas in the former the surface portions 6B are each formed by the smooth reflecting surface SR as is the case with the surface portion 2B of the substrate 1 in the fifth embodiment described previously in conjunction with FIGS. 11 and 12.

Hence it is evident that the pseudo-luminous panel Q of the above structure brings the same effects as those by the eighth embodiment of FIGS. 17 and 18 and the fifth embodiment of FIGS. 11 and 12.

Embodiment 12

Figure 26:
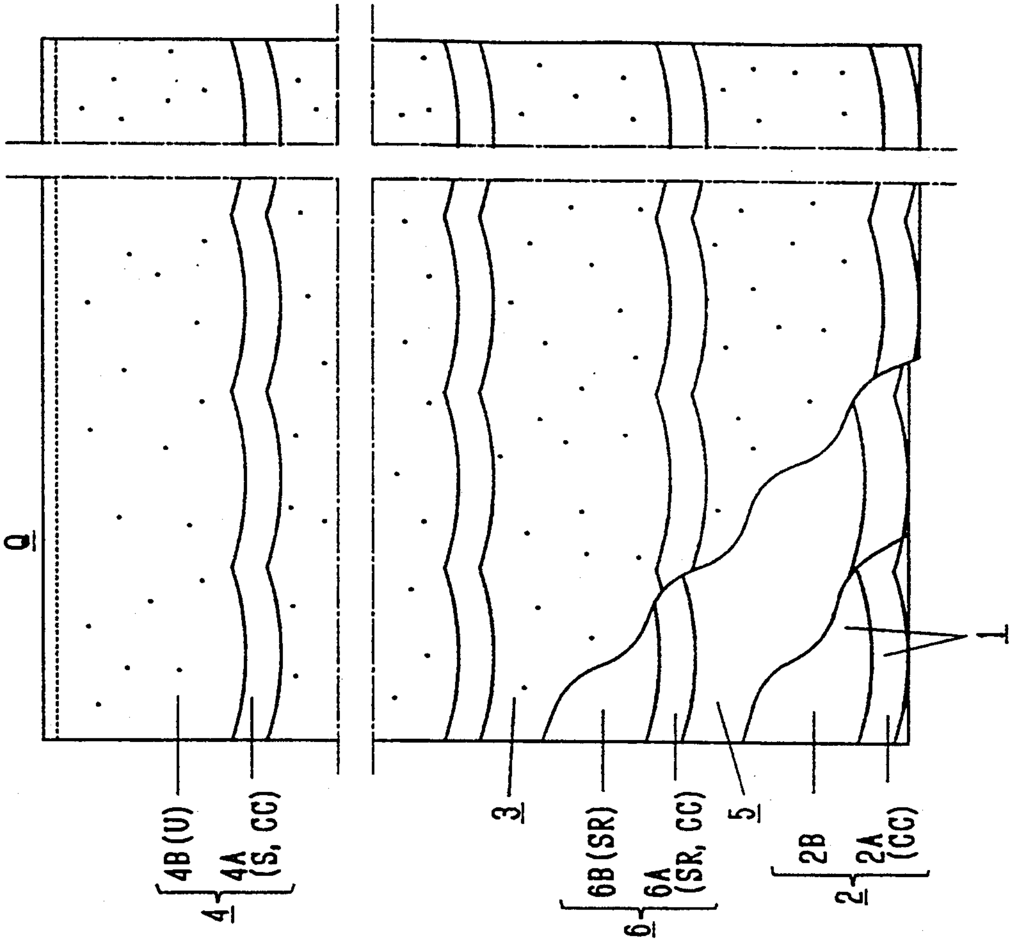
FIG. 26 is a schematic front view, partly cut away, showing the twelfth embodiment of the present invention.
Figure 25:
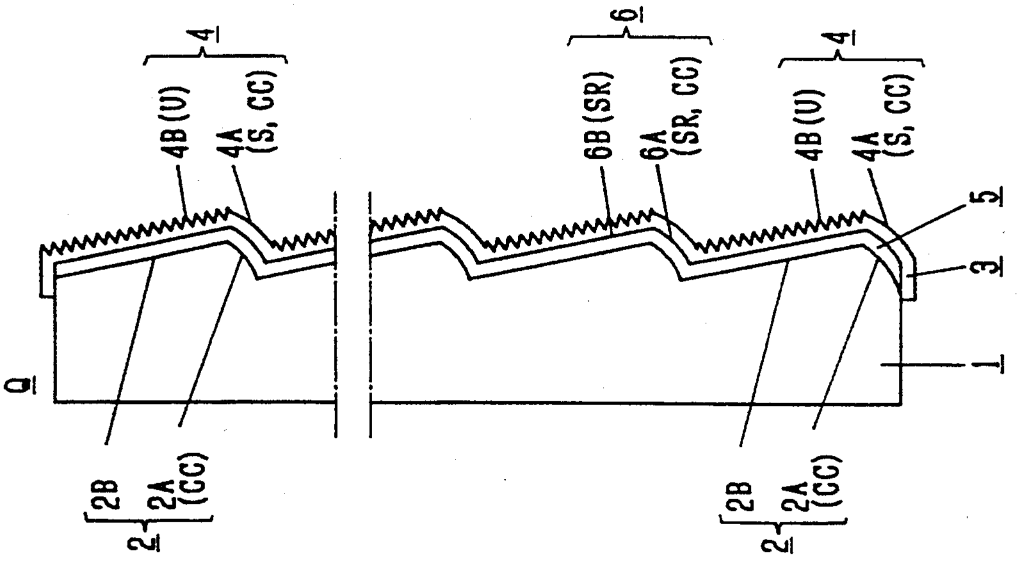
FIG. 25 is a longitudinal-sectional view schematically illustrating a twelfth embodiment of the pseudo-luminous panel according to the present invention.

Turning next to FIGS. 25 and 26, a twelfth embodiment of the pseudo-luminous panel Q according to the present invention will be described. The parts corresponding to those in FIGS. 21 and 22 are identified by the same reference numerals and no detailed description will be given thereof.

The pseudo-luminous panel Q of this embodiment is identical in construction with the tenth embodiment except that in the latter the obliquely upward band-like surface portions 6B of the reflecting film 5 are each formed by the irregular reflecting surface DR or uneven reflecting surface UR extending in a plane, whereas in the former the surface portions 6B are each formed by the smooth reflecting surface SR as in the case of the eleventh embodiment described above with respect to FIGS. 23 and 24.

Hence it is evident that the pseudo-luminous panel of this embodiment produces the same effects as those by the tenth embodiment of FIGS. 21 and 22 and the eleventh embodiment of FIGS. 23 and 24.

Embodiment 13

Figure 28:
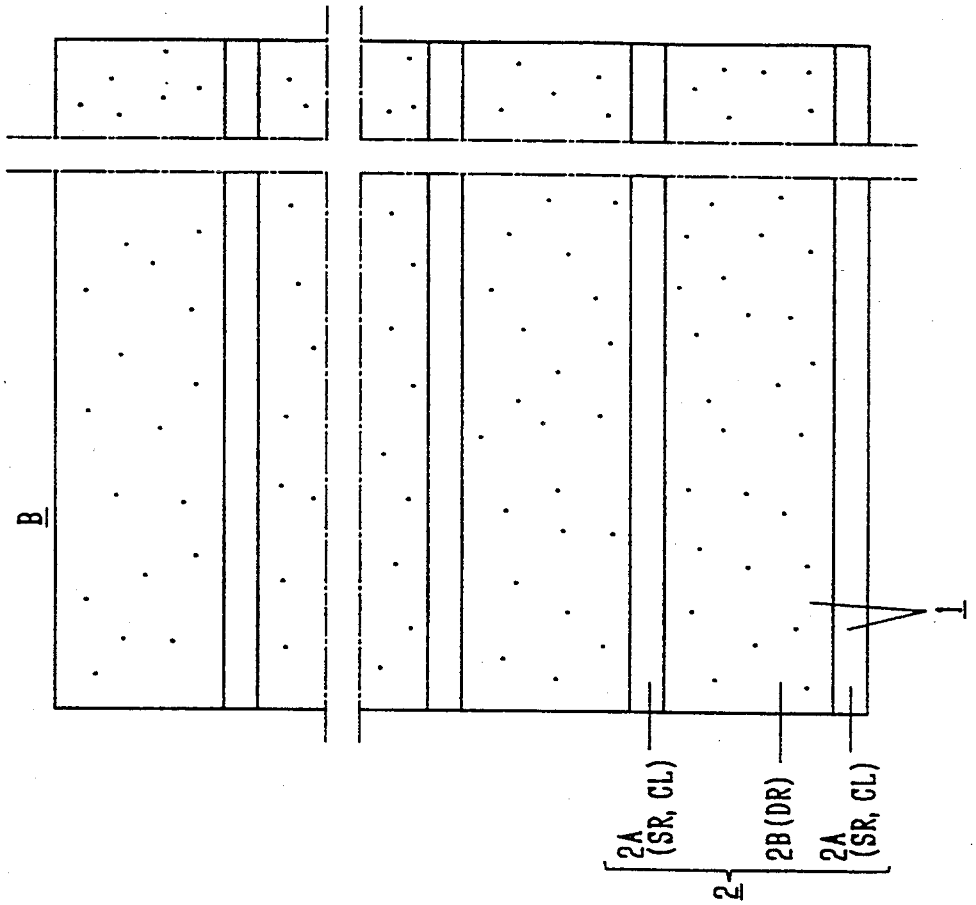
FIG. 28 is a schematic front view, partly cut away, showing the first embodiment of the substrate according to the present invention.
Figure 27:
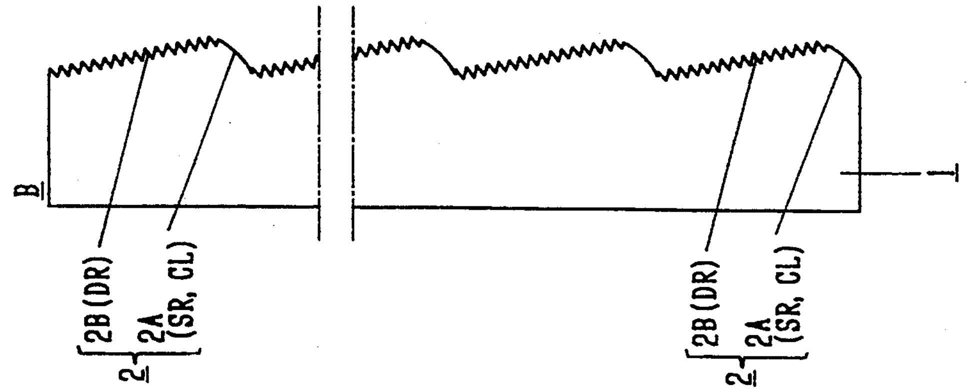
FIG. 27 is a longitudinal-sectional view schematically illustrating a first embodiment of the substrate according to the present invention.

Turning next to FIGS. 27 and 28, a first embodiment of the substrate for the pseudo-luminous panel according to the present invention will be described. The parts corresponding to those in FIGS. 1 and 2 are identified by the same reference numerals and no detailed description will be given thereof.

The substrate, indicated generally by B in FIGS. 27 and 28, is identical in construction with the first embodiment of FIGS. 1 and 2 except that the thin film optical color filter 3 in the latter is omitted.

Hence the pseudo-luminous panel Q of the present invention, described previously in conjunction with FIGS. 1 and 2 or 4 and 5, can be obtained simply by coating its thin film optical color filter 3 all over main surface 2 of the substrate 1.

Accordingly, the use of the substrate B shown in FIGS. 27 and 28 will allow easy fabrication of the pseudo-luminous panel Q of the present invention which has the excellent effects described previously with respect to FIGS. 1 and 2 or 4 and 5.

Embodiment 14

Figure 30:
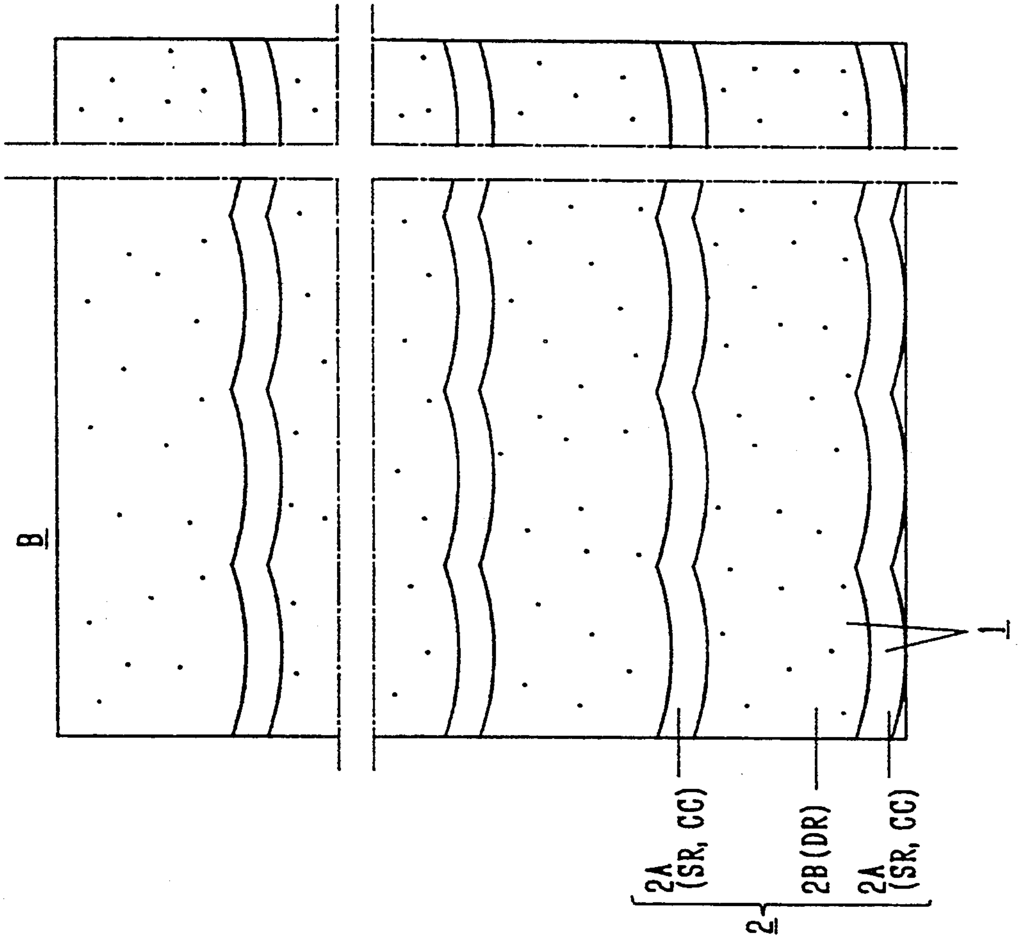
FIG. 30 is a schematic front view, partly cut away, showing the substrate depicted in FIG. 29.
Figure 29:
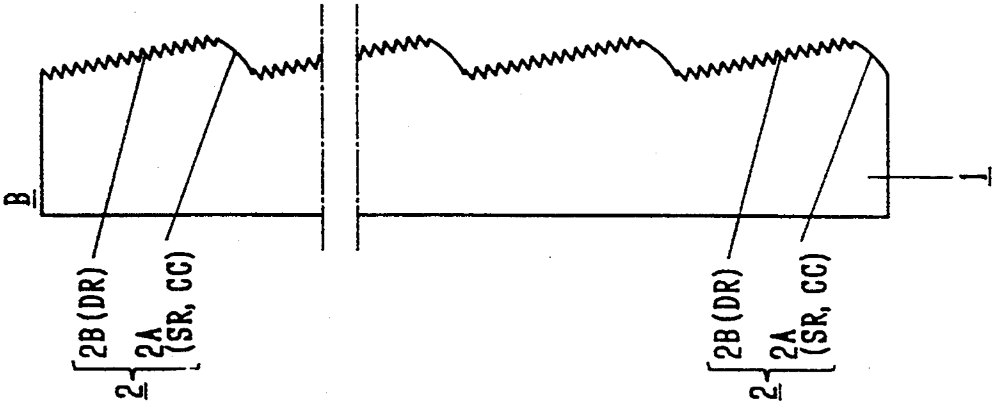
FIG. 29 is a longitudinal-sectional view schematically illustrating a second embodiment of the substrate according to the present invention.

Referring next to FIGS. 29 and 30, a second embodiment of the substrate B for the pseudo-luminous panel Q according to the present invention will be described. The parts corresponding to those in FIGS. 6 and 7 are identified by the same reference numerals and no detailed description will be given thereof.

The substrate B of this embodiment is identical in construction with the third embodiment of the pseudo-luminous panel Q except that the thin film optical color filter 3 in the latter is omitted.

Hence the pseudo-luminous panel Q of the present invention, described previously in conjunction with FIGS. 6 and 7 or 9 and 10, can be obtained simply by coating its thin film optical color filter 3 all over the main surface 2 of the substrate 1.

Accordingly, the use of the substrate B shown in FIGS. 29 and 30 will allow easy fabrication of the pseudo-luminous panel Q of the present invention which has the excellent effects described previously with respect to FIGS. 6 and 7 or 9 and 10.

Embodiment 15

Figure 32:
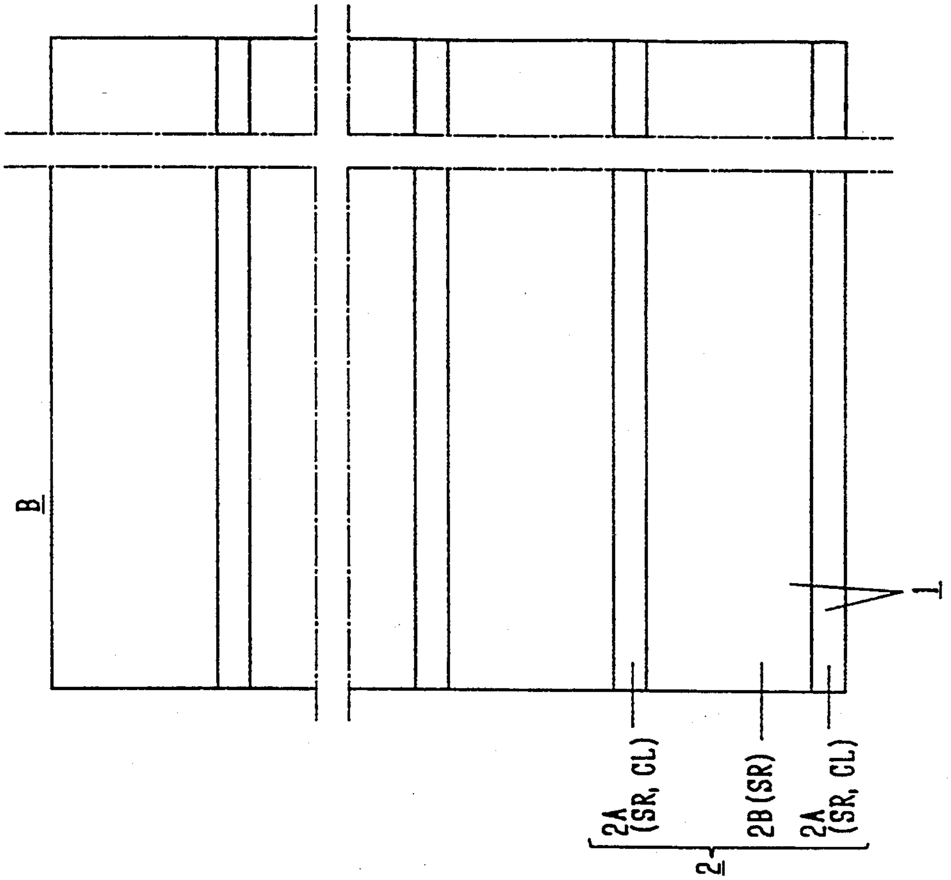
FIG. 32 is a schematic front view, partly cut away, showing the substrate depicted in FIG. 31.
Figure 31:
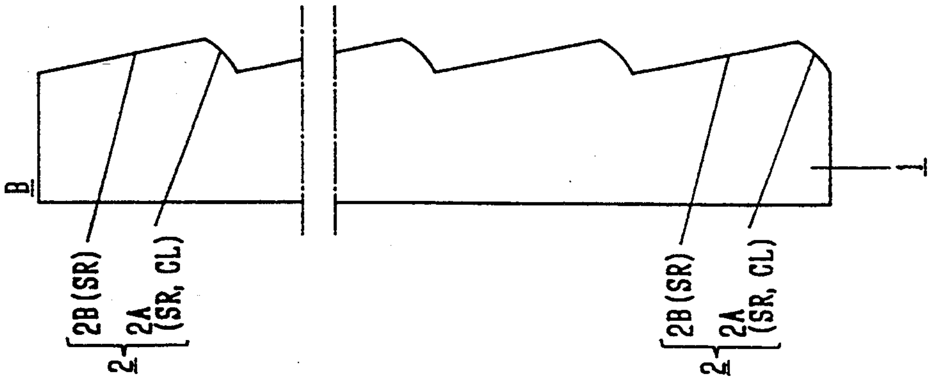
FIG. 31 is a longitudinal-sectional view schematically illustrating a third embodiment of the substrate according to the present invention.

Referring next to FIGS. 31 and 32, a third embodiment of the substrate B for the pseudo-luminous panel Q according to the present invention will be described. The parts corresponding to those in FIGS. 11 and 12 are identified by the same reference numerals and no detailed description will be given thereof.

The substrate B of this embodiment is identical in construction with the fifth embodiment of the pseudo-luminous panel Q except that the thin film optical color filter 3 in the latter is omitted.

Hence the pseudo-luminous panel Q of the present invention, described previously in conjunction with FIGS. 11 and 12, can be obtained simply by coating its thin film optical color filter 3 all over the main surface 2 of the substrate 1.

Accordingly, the use of the substrate B shown in FIGS. 31 and 32 will allow easy fabrication of the pseudo-luminous panel Q of the present invention which has the excellent effects described previously with respect to FIGS. 11 and 12.

Embodiment 16

Figure 34:
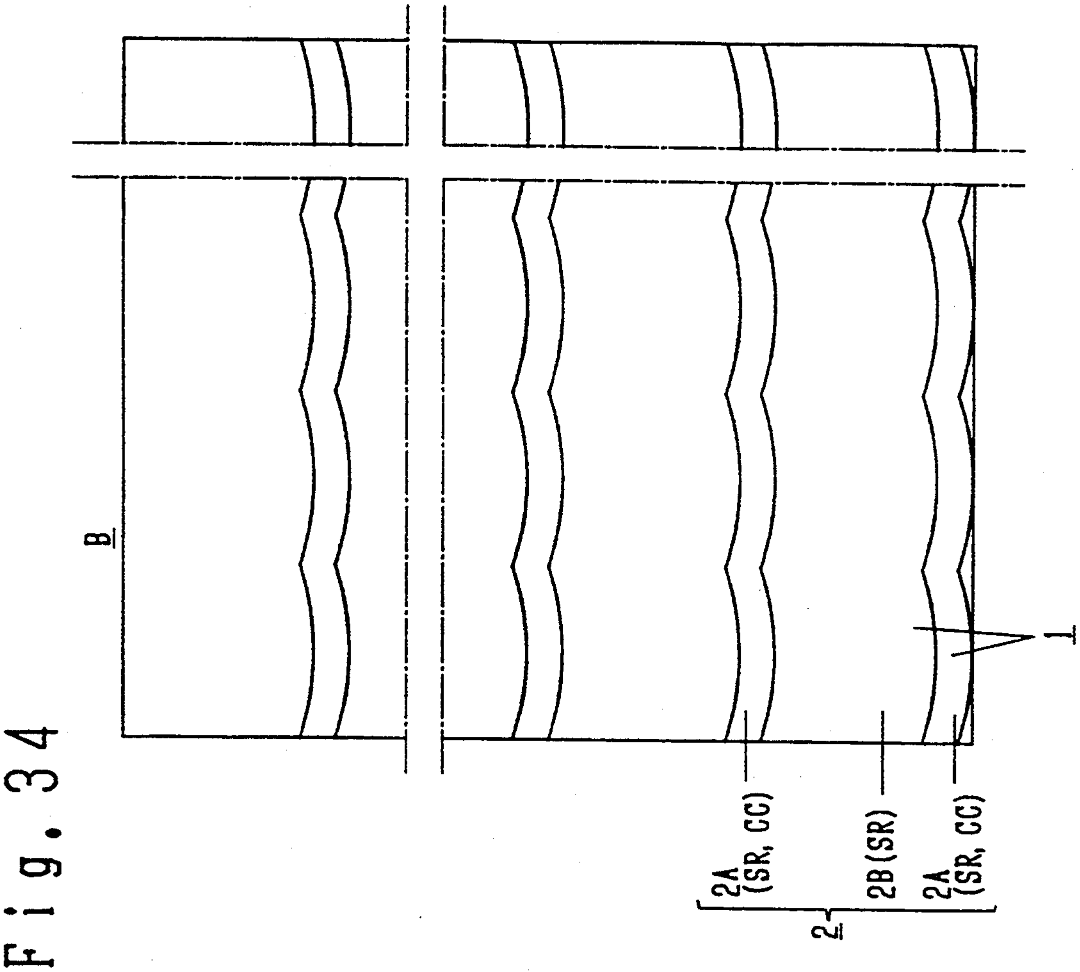
FIG. 34 is a schematic front view, partly cut away, showing the substrate depicted in FIG. 33.
Figure 33:
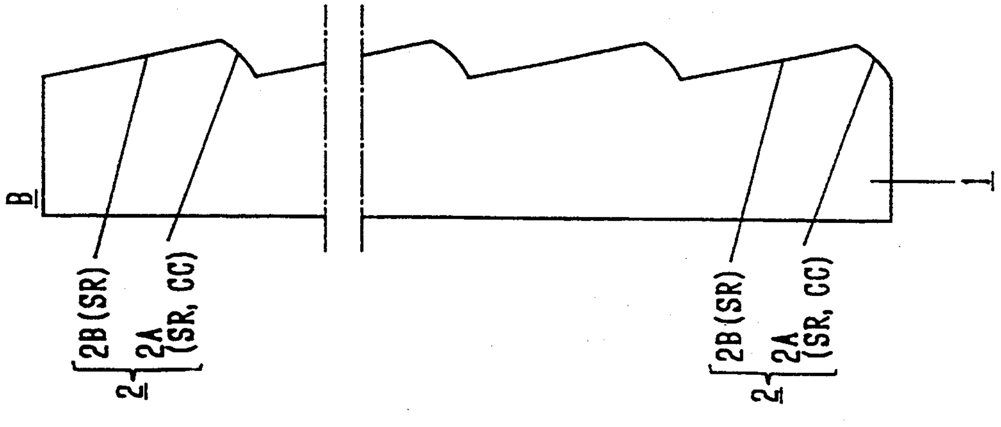
FIG. 33 is a longitudinal-sectional view schematically illustrating a fourth embodiment of the substrate according to the present invention.

Referring next to FIGS. 33 and 34, a fourth embodiment of the substrate B for the pseudo-luminous panel Q according to the present invention will be described. The parts corresponding to those in FIGS. 13 and 14 are identified by the same reference numerals and no detailed description will be given thereof.

The substrate B of this embodiment is identical in construction with the sixth embodiment of the pseudo-luminous panel Q except that the thin film optical color filter 3 in the latter is omitted.

Hence the pseudo-luminous panel Q of the present invention, described previously in conjunction with FIGS. 13 and 14, can be obtained simply by coating its thin film optical color filter 3 all over the main surface 2 of the substrate 1.

Accordingly, the use of the substrate B shown in FIGS. 33 and 34 will allow easy fabrication of the pseudo-luminous panel Q of the present invention which has the excellent effects described previously with respect to FIGS. 13 and 14.

Embodiment 17

Figure 36:
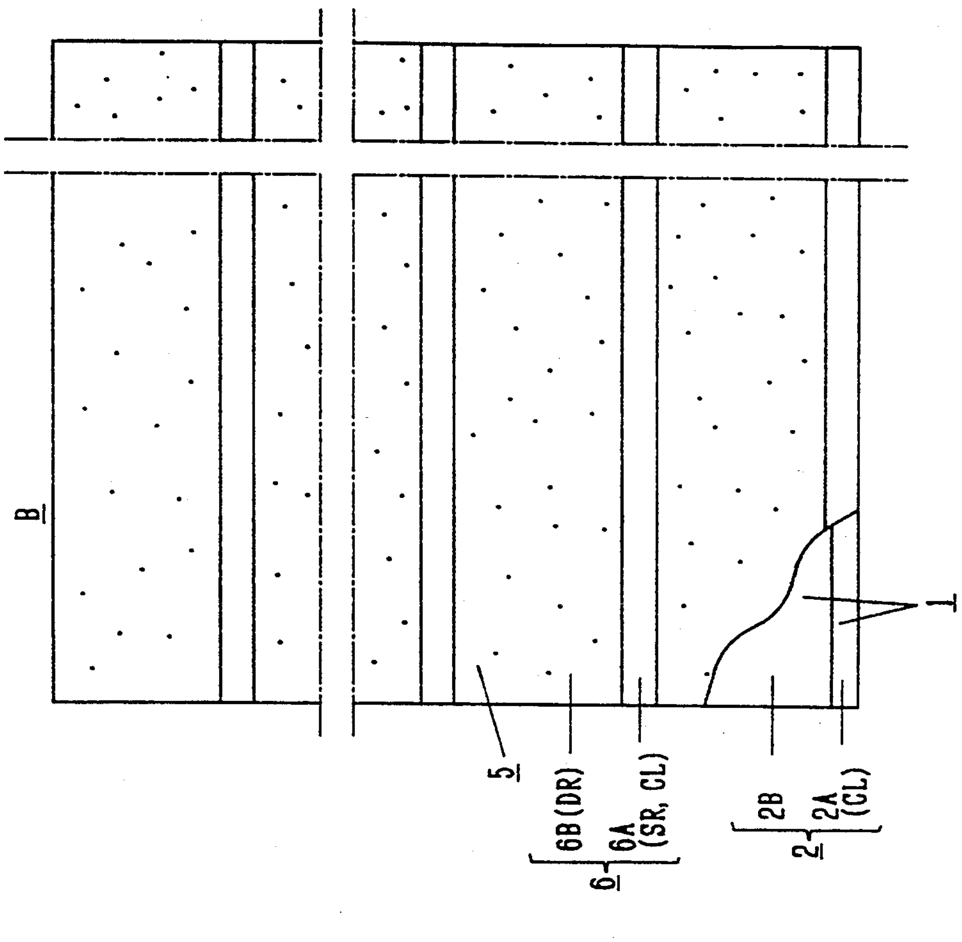
FIG. 36 is a schematic front view, partly cut away, showing the substrate depicted in FIG. 35.
Figure 35:
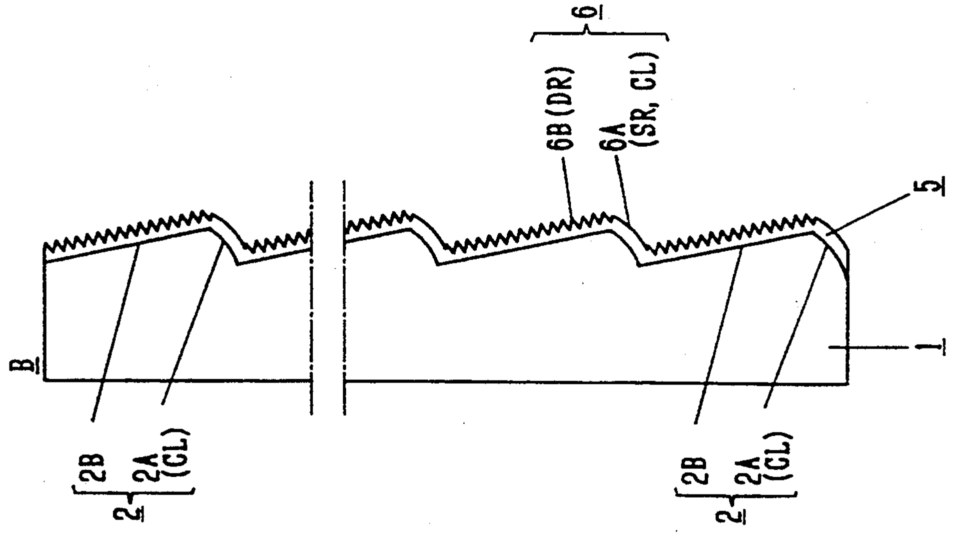
FIG. 35 is a longitudinal-sectional view schematically illustrating a fifth embodiment of the substrate according to the present invention.

Referring next to FIGS. 35 and 36, a fifth embodiment of the substrate B for the pseudo-luminous panel Q according to the present invention will be described. The parts corresponding to those in FIGS. 15 and 16 are identified by the same reference numerals and no detailed description will be given thereof.

The substrate B of this embodiment is identical in construction with the seventh embodiment of the pseudo-luminous panel Q except that the thin film optical color filter 3 in the latter is omitted.

Hence the pseudo-luminous panel Q of the present invention, described previously in conjunction with FIGS. 15 and 16 or 17 and 18, can be obtained simply by coating its thin film optical color filter 3 all over the surface 6 of the reflecting film 5.

Accordingly, the use of the substrate B shown in FIGS. 35 and 36 will allow easy fabrication of the pseudo-luminous panel Q of the present invention which has the excellent effects described previously with respect to FIGS. 15 and 16 or 17 and 18.

Embodiment 18

Figure 38:
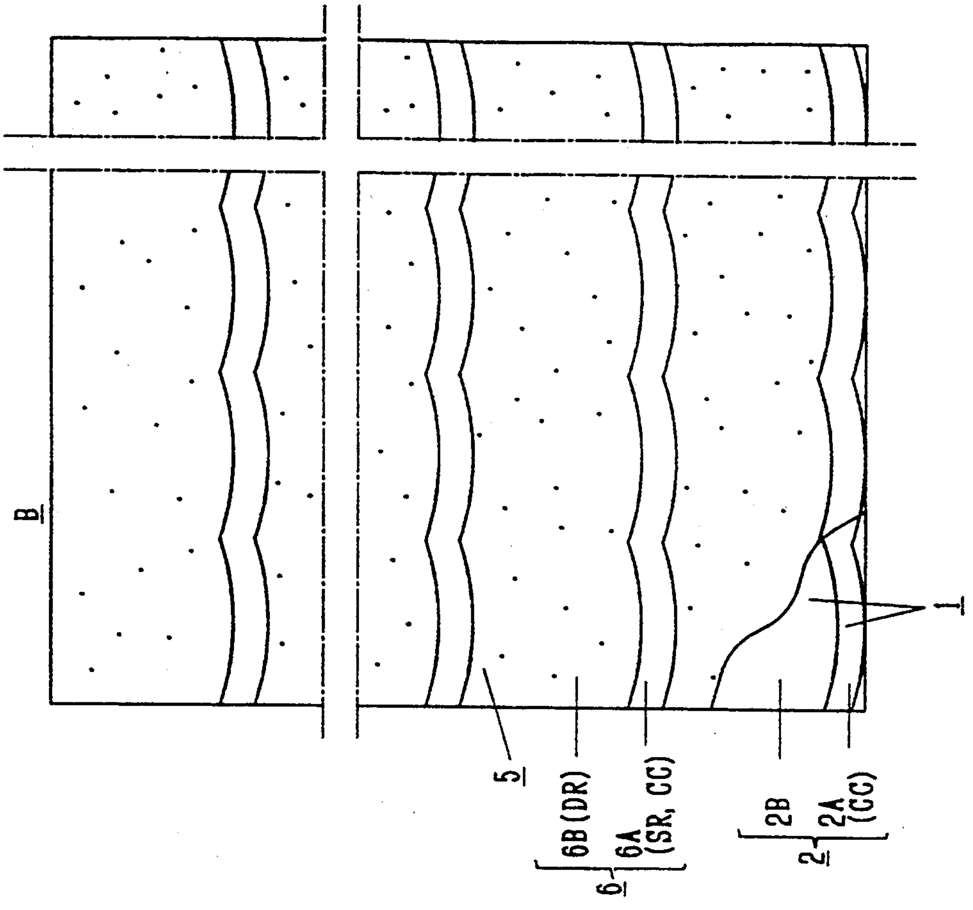
FIG. 38 is a schematic front view, partly cut away, showing the substrate depicted in FIG. 37.
Figure 37:
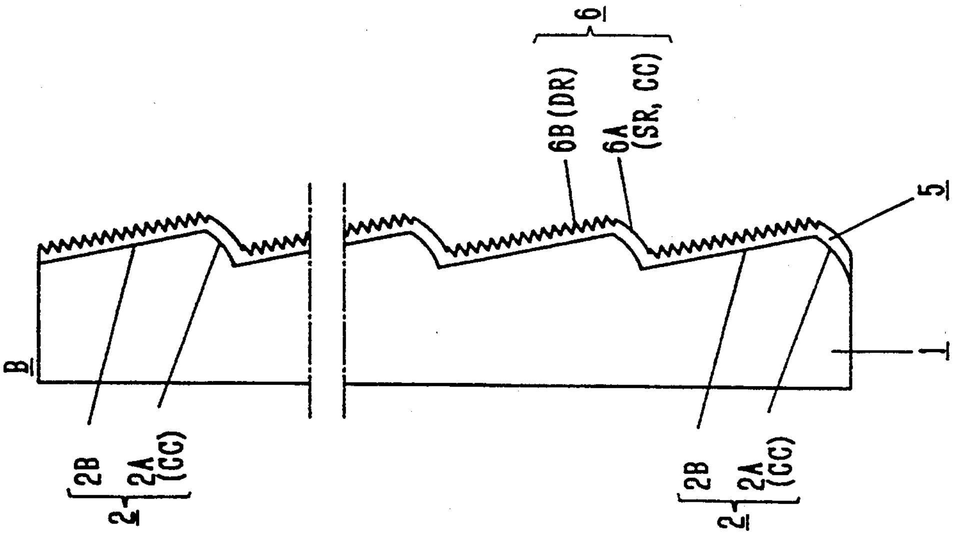
FIG. 37 is a longitudinal-sectional view schematically illustrating a sixth embodiment of the substrate according to the present invention.

Referring next to FIGS. 37 and 38, a sixth embodiment of the substrate B for the pseudo-luminous panel Q according to the present invention will be described. The parts corresponding to those in FIGS. 19 and 20 are identified by the same reference numerals and no detailed description will be given thereof.

The substrate B of this embodiment is identical in construction with the ninth embodiment of the pseudo-luminous panel Q except that the thin film optical color filter 3 in the latter is omitted.

Hence the pseudo-luminous panel Q of the present invention, described previously in conjunction with FIGS. 19 and 20 or 21 and 22, can be obtained simply by coating its thin film optical color filter 3 all over the surface 6 of the reflecting film 5.

Accordingly, the use of the substrate B shown in FIGS. 37 and 38 will-allow easy fabrication of the pseudo-luminous panel Q of the present invention which has the excellent effects described previously with respect to FIGS. 19 and 20 or 21 and 22.

Embodiment 19

Figure 40:
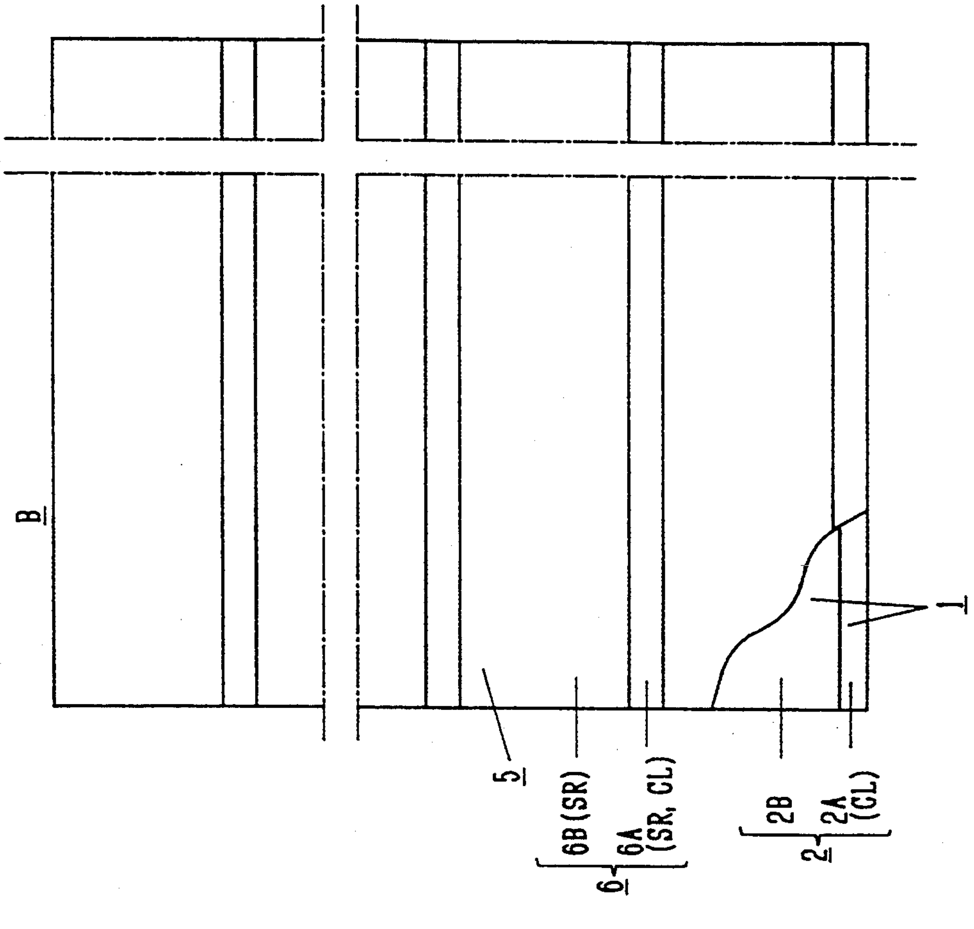
FIG. 40 is a schematic front view, partly cut away, showing the substrate depicted in FIG. 39.
Figure 39:
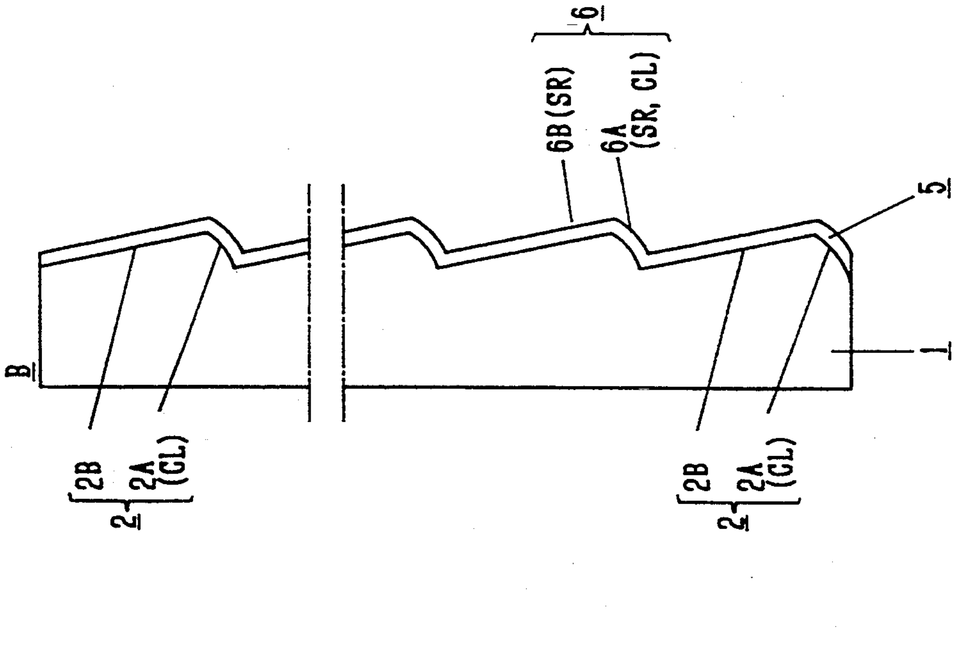
FIG. 39 is a longitudinal-sectional view schematically illustrating a seventh embodiment of the substrate according to the present invention.

Referring next to FIGS. 39 and 40, a seventh embodiment of the substrate B for the pseudo-luminous panel Q according to the present invention will be described. The parts corresponding to those in FIGS. 23 and 24 are identified by the same reference numerals and no detailed description will be given thereof.

The substrate B of this embodiment is identical in construction with the eleventh embodiment of the pseudo-luminous panel Q except that the thin film optical color filter 3 in the latter is omitted.

Hence the pseudo-luminous panel Q of the present invention, described previously in conjunction with FIGS. 23 and 24, can be obtained simply by coating its thin film optical color filter 3 all over the surface 6 of the reflecting film 5.

Accordingly, the use of the substrate B shown in FIGS. 39 and 40 will allow easy fabrication of the pseudo-luminous panel Q of the present invention which has the excellent effects described previously with respect to FIGS. 23 and 24.

Embodiment 20

Figure 42:
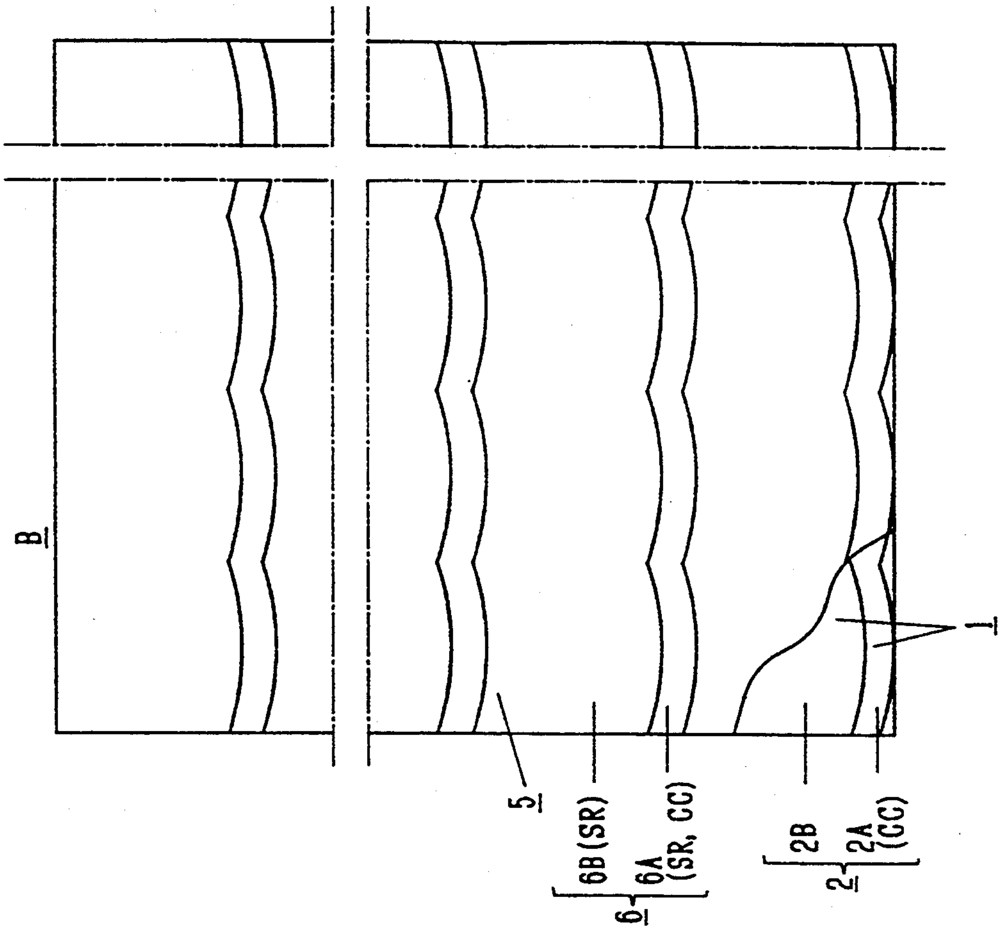
FIG. 42 is a schematic front view, partly cut away, showing the substrate depicted in FIG. 41.
Figure 41:
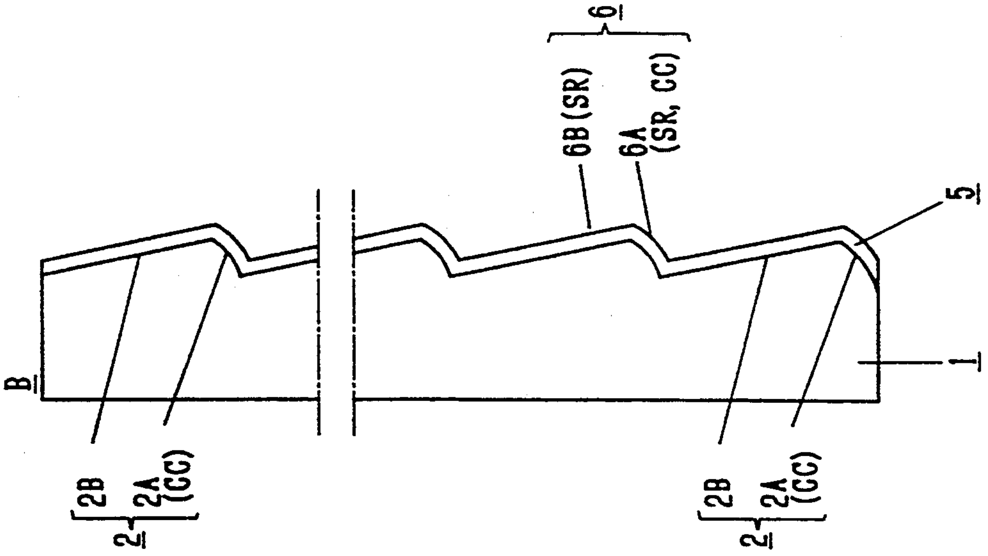
FIG. 41 is a longitudinal-sectional view schematically illustrating a eighth embodiment of the substrate according to the present invention.

Referring next to FIGS. 41 and 42, an eighth embodiment of the substrate B for the pseudo-luminous panel Q according to the present invention will be described. The parts corresponding to those in FIGS. 25 and 26 are identified by the same reference numerals and no detailed description will be given thereof.

The substrate B of this embodiment is identical in construction with the twelfth embodiment of the pseudo-luminous panel Q except that the thin film optical color filter 3 in the latter is omitted.

Hence the pseudo-luminous panel Q of the present invention, described previously in conjunction with FIGS. 25 and 26, can be obtained simply by coating its thin film optical color filter 3 all over the surface 6 of the reflecting film 5.

Accordingly, the use of the substrate B shown in FIGS. 41 and 42 will allow easy fabrication of the pseudo-luminous panel Q of the present invention which has the excellent effects described previously with respect to FIGS. 25 and 26.

Embodiment 21

Figure 43:
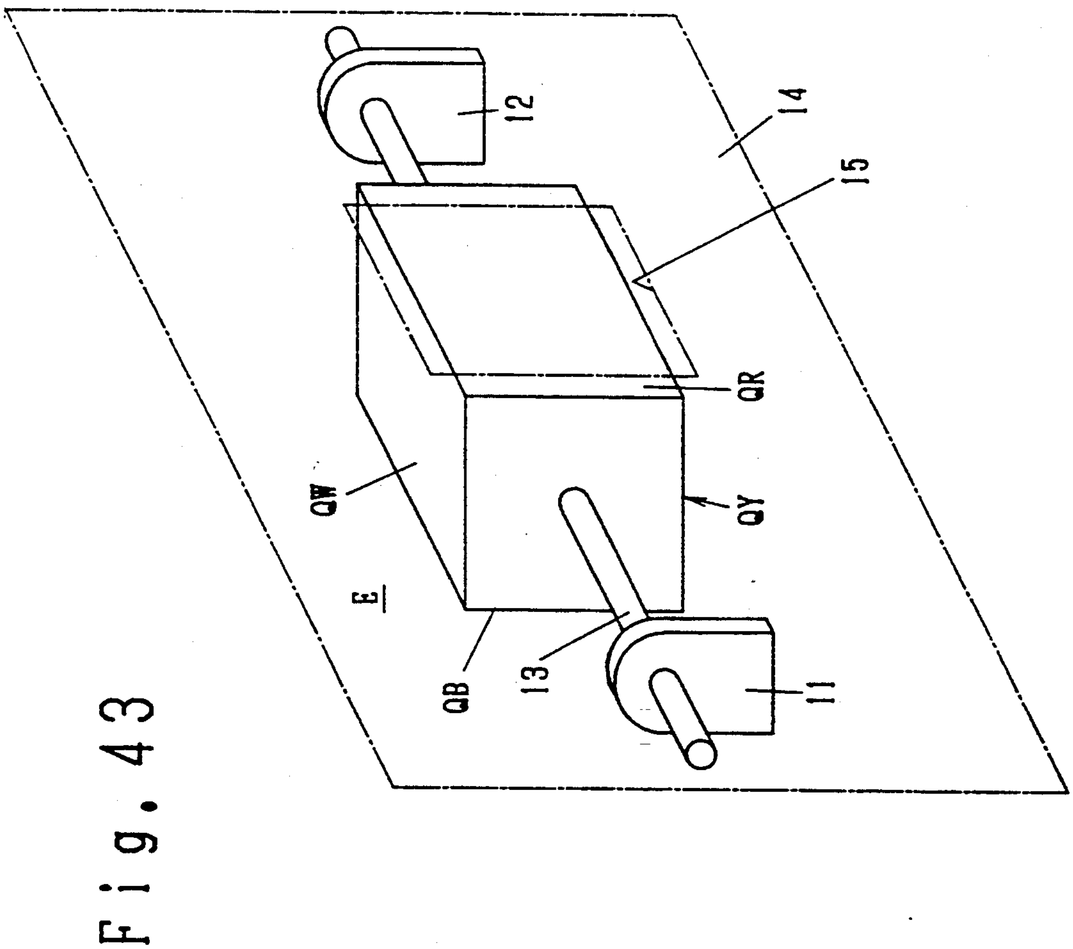
FIG. 43 is a schematic perspective view illustrating a first embodiment of the display element according to the present invention.

Turning next to FIG. 43, a first embodiment of the display element employing the pseudo-luminous panels of the present invention will be describes.

The display element, denoted generally by E in FIG. 43, has a construction in which four pseudo-luminous panels QR, QY, QB and QW of any one of the first to twelfth embodiments described above are disposed at 90 degrees angular intervals about a rotary shaft 13 pivotally supported at both ends by bearing 11 and 12 in such a manner as to turn by steps of 90 degrees in a forward or backward direction. In this instance, thin film optical color filters 3 of the pseudo-luminous panels QR, QY, QB and QW have difference pass bands in terms of their band-pass characteristics so that patterns on the substrate 1 are seen in different hues, for example, red, yellow, blue and white.

In this embodiment a style strip 14 having a window 15 is disposed in front of the display element E and the rotary shaft 13 is turned by suitable means by step of 90 degrees in the forward or backward direction to selectively bring one of the pseudo-luminous panels QR, QY, QB and QW to the front just behind the window 15.

When such a display element E, combined with the style strip 14, is disposed outdoors, for example, high above the ground in the same manner as described previously in connection with the pseudo-luminous panels of the first to twelfth embodiment, the pattern on that selected one of the pseudo-luminous panels QR, QY, QB and QW which has been brought to the front can be viewed through the window 15 in the hue based on the pass band of the color filter 3 of the selected pseudo-luminous panel (for example, red, yellow, blue or white) in the daytime and at night. In this instance, the excellent effects described previously in respect of the first to twelfth embodiment are produced.

Hence the display element E of this embodiment is capable of displaying patterns in different colors, as desired. Accordingly, the display element E can be applied to a traffic signal display, for example.

Embodiment 22

Figure 44:
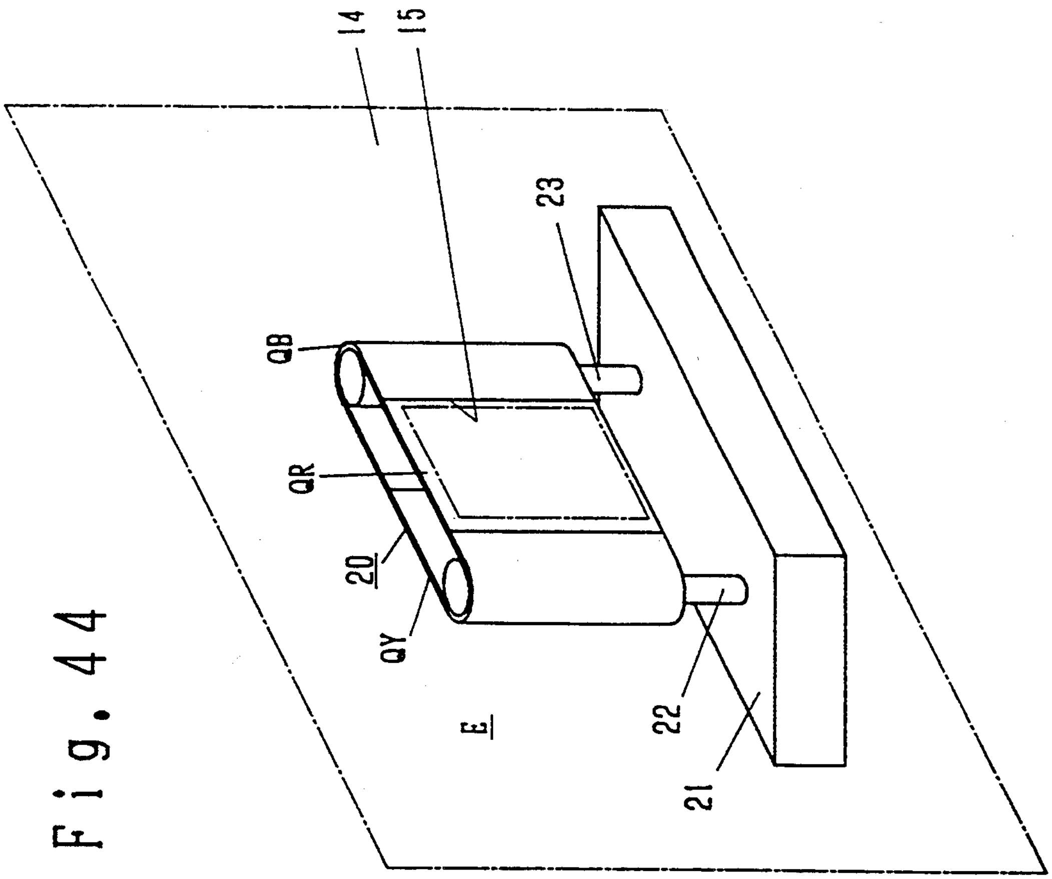
FIG. 44 is a schematic perspective view illustrating a second embodiment of the display element according to the present invention.

Turning next to FIG. 44, a second embodiment of the display element according to the present invention will be described.

The display element E of this embodiment has a construction in which three flexible pseudo-luminous panels QR, QY and QB according to any one of the aforementioned first to twelfth embodiment of the present invention are sequentially arranged on an endless belt 20 or sequentially arranged to form such an endless belt 20 and belt 20 is stretched between rotary shafts 22 and 23 planted on a support 21.

In this instance, the thin film optical color filters 3 of the pseudo-luminous panels QR, QY and QB have different pass bands so that their patterns are viewed in different colors, for example, red, yellow and blue as in the first embodiment of the display element.

The style strip 14 having the window 15 is disposed in front of the display element E, and by turning the rotary shafts 22 and 23 in the forward or backward direction by suitable means, the pseudo-luminous panels QR, QY and QB can be selectively brought to the front for display through the window 15.

When the display element E of this embodiment is disposed outdoors, for example, high above the ground and the style strip 14 is placed in front of the display element E as mentioned above, the pattern on that selected one of the pseudo-luminous panels QR, QY and QB which has been brought to the front can be viewed through the window 15 in the hue based on the pass band of the color filter 3 of the selected pseudo-luminous panel (for example, red, yellow or blue) in the daytime and at night.

Thus the display element E of this embodiment is also capable of displaying patterns in different colors and, at the same time, produces the excellent effects described previously in respect of the first to twelfth embodiments of the present invention.

Accordingly, the display element E of this embodiment is also applicable to a traffic signal display, for instance.

Embodiment 23

Figure 45:
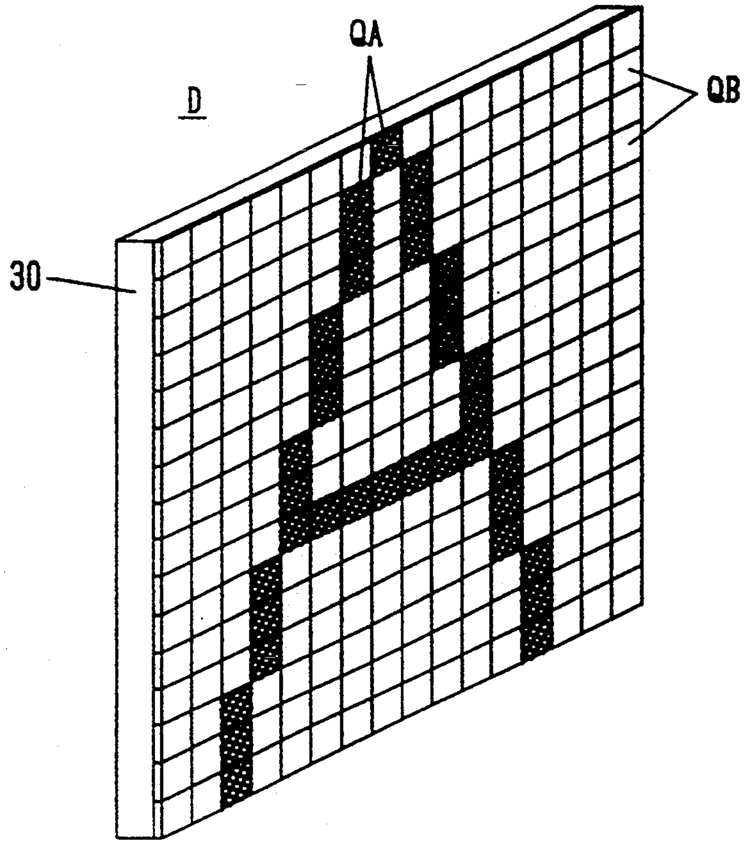
FIG. 45 is a schematic perspective view illustrating an embodiment of the fixed matrix display device according to the present invention.

Turning next to FIG. 45, an embodiment of the fixed matrix display device employing the pseudo-luminous panels according to the present invention.

The fixed matrix display device, denoted generally by D in FIG. 45, has a construction in which a number of pseudo-luminous panels Q according to any one of the first to twelfth embodiments are arranged in a matrix form. In this instance, thin film optical color filters 3 of the pseudo-luminous panels (indicated by QB) except those QA each have a pass band in its band-pass characteristic for blue color, for example, and the thin film optical color filters of the other pseudo-luminous panels QA each have a pass band in its band-pass characteristic for red color, for instance. The pseudo-luminous panels Q are arranged so that the pseudo-luminous panels QA forms a pattern of a character, for example, "A".

When such a fixed matrix display device D is installed outdoors, for example, high above the ground, the pattern of the character "A" can be displayed in the hue (red) based on the pass band of the color filter 3 of each pseudo-luminous panel QA in the daytime and at night.

Thus the fixed matrix display device D of this embodiment can be employed for advertisement.

Embodiment 24

Figure 46:
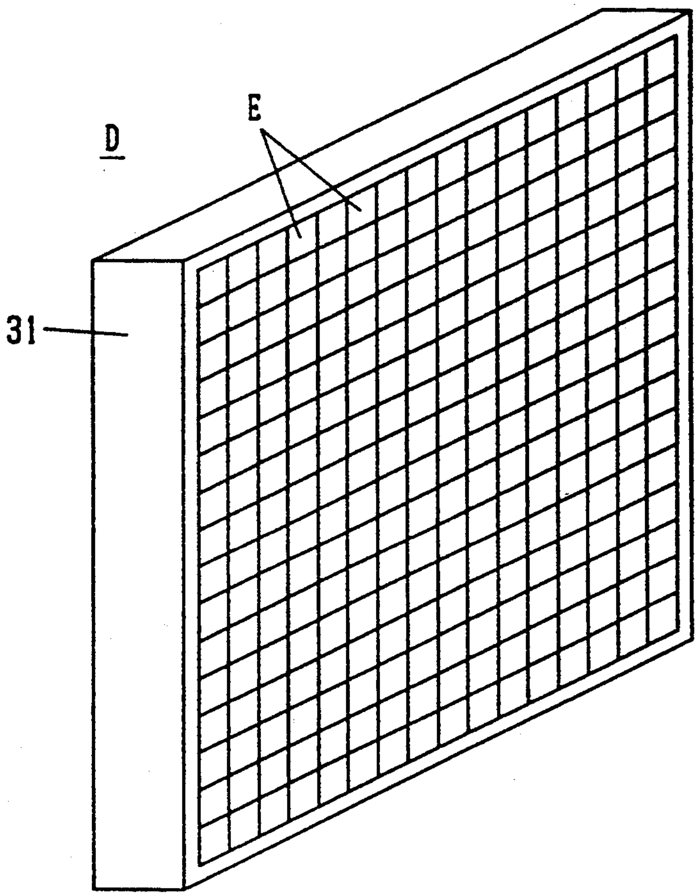
FIG. 46 is a schematic perspective view illustrating an embodiment of the matrix display device according to the present invention.
Figure 48:
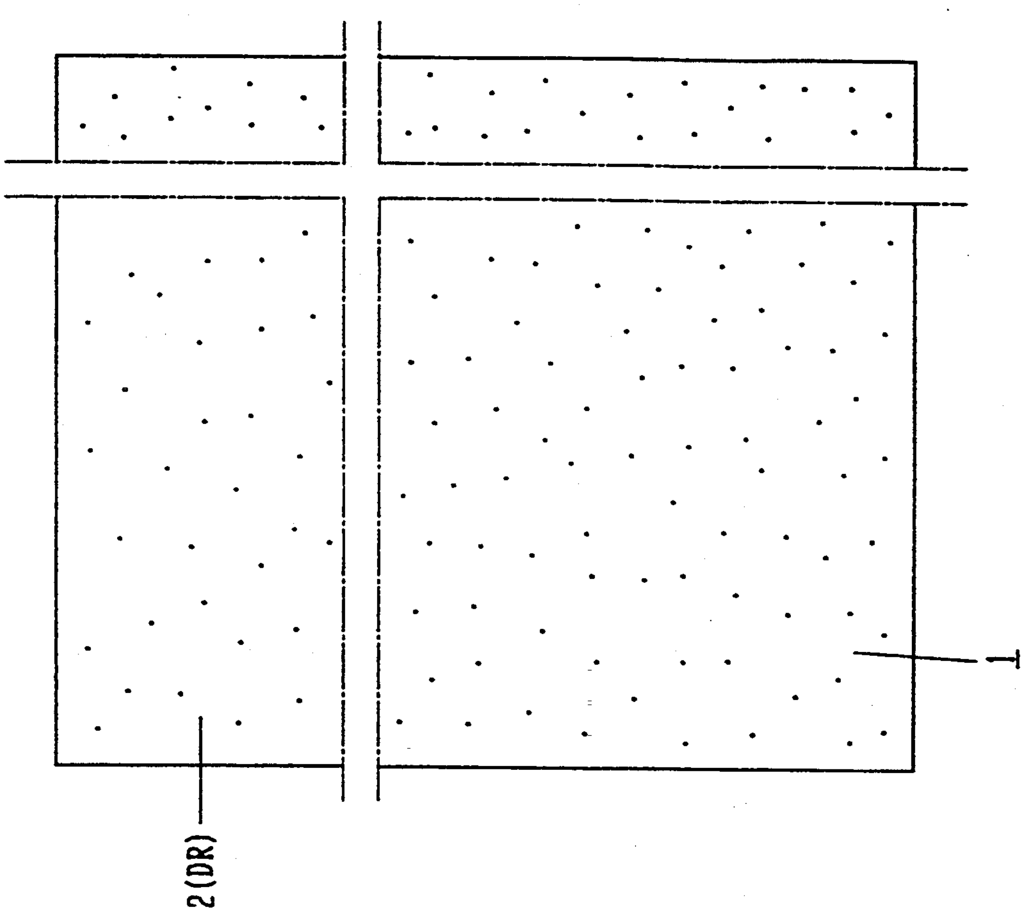
FIG. 47 and 48 are schematic diagram showing a conventional pseudo-luminous panel.
Figure 47:
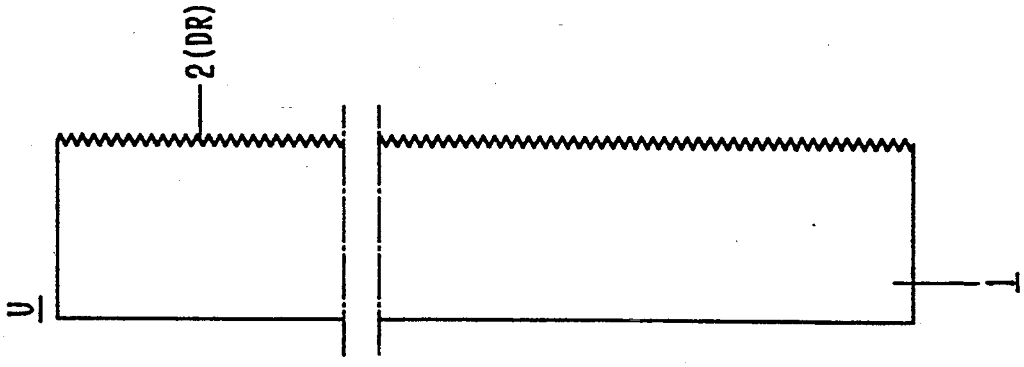

Turning next to FIG. 46, an embodiment of the matrix display device D employing the display element according to the present invention will be described.

The matrix display device D of this embodiment has a construction in which a number of display elements E according to the embodiments shown in FIG. 43 or 44 are arranged in a matrix form.

According to the matrix display device D of this embodiment, since each display element E is capable of changing the color of its display as mentioned above, a character, figure or like pattern can be displayed in a desired color in the daytime and at night.

It will be apparent that many modifications and variations may be effected without departing from the scope of the novel concepts of the present invention.

What is claimed is:

1. A pseudo-luminous panel comprising:
- a substrate;
- a reflecting film formed all over a main surface of said substrate; and
- a thin film optical color filter formed on the surface of said reflecting film on the opposite side from said substrate;

wherein:
- said main surface of said substrate is formed by a surface in which obliquely downward band-like surface portions and obliquely upward band-like surface portions are alternately arranged side by side in a vertical direction,
- obliquely downward band-like surface portions on said obliquely downward band-like surface portions of said substrate, forming the surface of said reflecting film on the opposite side from said substrate, are each a smooth reflecting surface;
- obliquely upward band-like surface portions on said obliquely upward band-like surface portions of said substrates, forming the surface of said reflecting film on the opposite side from said substrate, are each a reflecting surface; and
- obliquely downward band-like surface portions on said obliquely downward band-like surface portions of said reflecting film, forming the surface of said thin film optical color filter on the opposite side from said substrate, are each a smooth surface.

2. The pseudo-luminous panel of claim 1 wherein said obliquely downward band-like surface portions forming said main surface of said substrate are each a surface which convex downward and extends straight widthwise of said panel.

3. The pseudo-luminous panel of claim 1 wherein said obliquely downward band-like surface portions forming said main surface of said substrate are each a surface which is convex downward and whose convexity is discontinuous at regular intervals widthwise of said panel.

4. The pseudo-luminous panel of claim 1 wherein said substrate is flexible.

5. A substrate for a pseudo-luminous panel, comprising:
- a substrate; and
- a reflecting film formed all over a main surface of said substrate;

wherein:
- said main surface of said substrate is formed by a surface in which obliquely downward band-like surface portions and obliquely upward band-like surface portions are alternately arranged side by side in a vertical direction,
- obliquely downward band-like surface portions on said obliquely downward band-like surface portions of said substrate, forming the surface of said reflecting film on the opposite side from said substrate are each a smooth reflecting surface; and obliquely upward band-like surface portions on said obliquely upward band-like surface portions of said substrate, forming the surface of said reflecting film on the opposite side from said substrate, are each a reflecting surface.

6. The substrate of claim 5 wherein said obliquely downward band-like surface portions forming said main surface of said substrate are each a surface which is convex downward and extends straight widthwise of said substrate.

7. The substrate of claim 5 wherein said obliquely downward band-like surface portions forming said main surface of said substrate are each a surface which is convex downward and whose convexity is discontinuous at regular intervals widthwise of said substrate.

8. The substrate of claim 5 wherein said substrate itself is flexible.

* * * * *